United States Patent [19]

Navratil et al.

[11] Patent Number: 4,811,787
[45] Date of Patent: Mar. 14, 1989

[54] METHOD FOR REDUCING THE PERMEABILITY OF UNDERGROUND STRATA DURING SECONDARY RECOVERY OF OIL

[75] Inventors: Martin Navratil, West Hill; Jimmy P. Baytycky, Calgary; Mojmir Sovak, Toronto; Mark Mitchell, London, all of Canada

[73] Assignee: Borden Company Limited, West Hill, Canada

[21] Appl. No.: 154,467

[22] Filed: Feb. 8, 1988

Related U.S. Application Data

[60] Division of Ser. No. 901,985, Sep. 2, 1986, abandoned, which is a continuation of Ser. No. 613,897, May 24, 1984, abandoned, which is a continuation-in-part of Ser. No. 397,452, Jul. 12, 1982, abandoned.

[30] Foreign Application Priority Data

Mar. 11, 1982 [CA] Canada .................................. 398179

[51] Int. Cl.$^4$ ...................... E21B 33/138; E21B 43/22
[52] U.S. Cl. .................................... 166/273; 166/295; 405/264
[58] Field of Search ............... 166/270, 273, 274, 275, 166/294, 295, 300; 405/264

[56] References Cited

U.S. PATENT DOCUMENTS

| | | |
|---|---|---|
| 2,175,393 | 10/1939 | Hentrich et al. ............... 528/165 X |
| 2,975,126 | 3/1961 | Blaricom et al. . |
| 3,084,056 | 4/1963 | Archer . |
| 3,291,212 | 12/1966 | Peacock . |
| 3,686,872 | 8/1972 | Whitworth et al. . |
| 3,788,081 | 1/1974 | Sarkisian et al. . |
| 3,884,861 | 5/1975 | Whitworth et al. . |
| 4,074,757 | 2/1978 | Felber et al. . |
| 4,091,868 | 5/1978 | Kozlowski et al. . |
| 4,146,214 | 4/1979 | Kalfoglou . |
| 4,210,204 | 7/1980 | Christopher, Jr. et al. . |
| 4,212,747 | 7/1980 | Swanson . |
| 4,246,124 | 1/1981 | Swanson . |
| 4,300,634 | 11/1981 | Clampitt . |
| 4,307,980 | 12/1981 | Meyer et al. . |
| 4,413,680 | 11/1983 | Sandiford et al. . |

FOREIGN PATENT DOCUMENTS 1122308 8/1968 United Kingdom .

OTHER PUBLICATIONS

Walker, *Formaldehyde*, Third Edition, Pub. 1964, Reinhold Publishing Corp., London, pp. 511, 552 and 553.
Knopp et al., Chemistry and Application of Phenolic Resins, Springer Verlag, pp. 39, 40, 54 and 55 (1979).

*Primary Examiner*—William P. Neuder
*Attorney, Agent, or Firm*—Robbins & Laramie

[57] ABSTRACT

The invention provides a method for the secondary recovery of oil from an oil-bearing stratum having a zone of high fluid permeability, in which this zone is plugged by introducing into the stratum a gelable solution comprising an alkaline material, a polyphenolic vegetable material such as mimosa tannin extract and formaldehyde, the last compound being present as free formaldehyde, paraformaldehyde, a phenol-formaldehyde resole, hexamethylenetetramine or urea-formaldehyde concentrate. The gelable solution has a pH of at least 9.5 and may optionally include a viscosifier. The gelable solutions are relatively insensitive to brines or temperature and gel to produce mechanically strong gels, even in the presence of oil-wet minerals. If desired, the alkaline material can be an alkali metal carbonate, and the use of such carbonates permits the permeability of the plugged high permeability zone to be adjusted after formation of the gel by treating the gel with acid.

44 Claims, 8 Drawing Sheets

METHOD FOR REDUCING THE PERMEABILITY OF UNDERGROUND STRATA DURING SECONDARY RECOVERY OF OIL

This application is a division of application Ser. No. 901,985, filed Sept. 2, 1986, now abandoned, which is a continuation of application Ser. No. 613,897, filed May 24, 1984, now abandoned, which is a continuation-in-part of application Ser. No. 397,452, filed July 12, 1982, now abandoned.

BACKGROUND OF THE INVENTION

The invention relates to a method of reducing the permeability of underground strata during secondary recovery of oil.

When an oil well is first drilled, oil will often flow from the well under the natural pressure existing in oil-bearing strata. When this natural pressure becomes insufficient, further quantities of oil may be recovered from the well by a mechanical pump. However, it is well known to those skilled in the art that even when no more oil can be recovered from the well simply by mechnical pumping, large quantities of oil often still remain in the oil-bearing stratum, especially if the oil is a heavy, viscous type of crude oil. To recover at least part of this residual oil, which will not flow naturally to the bottom of an oil well penetrating the oil-bearing stratum, so-called "secondary" recovery techniques have been developed. In such secondary recovery techniques, a flooding, liquid (which may be, for example, water, brine, an aqueous solution of a polymer, an aqueous solution of a surfactant or a hydrocarbon fluid) is pumped down an injector well. The flooding liquid flows from the injector well through the oil-bearing strata and forces at least part of the residual oil into a producer well. In some cases, it is advantageous to inject steam down the injector well since the resultant heating of the oil-bearing strata reduced the viscosity of the oil present therein and assists flow of the oil to the producer well.

Unfortunately, the various zones within an oil-bearing strata often differ greatly in fluid permeability. Often it is found that there are fractures within the oil-bearing strata; these fractures may be natural or may occur because of the fracturing normally effected near the bottom of a producer well in order to assist oil flow thereinto during the first phase of the recovery. Alternatively, no actual fractures may be present within the oil-bearing stratum but there may be zones of, for example, loosely packed sand of very high-permeability. In some cases even if no high-permeability zones are originally present in the oil-bearing stratum, such zones may be created by the action of the flooding liquid sweeping through the oil-bearing stratum. Where such high-permeability zones are present, almost all the flow of flooding fluid takes place along these zones with the result that, after a short period of flooding, almost all the liquid recovered from the producer well comprises mainly flooding fluid with only a small proportion of oil, while significant amounts of displaceable oil in zones of lower permeability within the oil-bearing strata are not recovered. Thus, the presence of such zones of high-permeability greatly decreases the efficiency of the secondary recovery process.

In order to overcome the aforementioned problems caused by the highpermeability zones in the oil-bearing stratum, it is known to inject into the stratum solutions which at least partially plug the high-permeability zones, thereby greatly decreasing the permeability of these zones, so that flooding fluid injected thereafter is forced to traverse other zones in the oil-bearing stratum, thus leading to increased oil recovery. The liquids used to plug the high-permeability zones are usually injected via the injector well, but may also be injected via the producer well if necessary. For example, U.S. Pat. No. 3,396,790, issued Aug. 13, 1968 to Eaton, proposes a method of plugging high-permeability zones in which water is first injected into a well at a high rate, then a viscous solution comprising sodium silicate, polyacrylamide and water is injected. After the injection of the viscous solution, water is again injected at a high rate and under high pressure, followed by injection of a less viscous solution containing ferrous sulfate and water. By carefully controlling the pressure and injection rates of the viscous and ferrous sulfate solutions, the two solutions react together to form plugs in the highpermeability zones.

U.S. Pat. No. 3,749,172, issued July 31, 1973 to Hessert et al, proposes a similar procedure for plugging high-permeability zones, but in which the plugging solution contains a polymeric gel.

U.S. Pat. No. 3,882,938, issued May 13, 1975 Bernard. describes a plugging technique involving the injection into the oil-bearing stratum of one or more aqueous solutions of reagents that react within the oil-bearing stratum to form a plugging material. One specific solution described is an aqueous solution of sodium silicate and a gelling agent such as an acid, an ammonium salt, a lower aldehyde, a polyvalent metal salt or an alkali metal aluminate.

U.S. Pat. No. 3,897,827, issued Aug. 5, 1985 to Felber et al, describes a gel forming solution consisting of a dichromate activator and a lignosulfonate solution containing an alkali metal or alkaline earth metal halide.

U.S. Pat. No. 3,583,486, issued June 8, 1971 to Stratton, describes a plugging solution containing an ethoxylated condensation product of a phenol and formaldehyde.

U.S. Pat. No. 4,212,747, issued July 15, 1980 to Swanson, proposes as a plugging solution a shear thickening polymer composition containing a high-molecular weight polyalkylene oxide polymer with a phenol/aldehyde resin, the composition being alkaline.

U.S. Pat. No. 4,246,124, issued Jan. 20, 1981 to Swanson, describes an aqueous plugging solution containing a water-dispersible polymer, an aldehyde and a phenolic compound, which may either by a simple phenol or a tannin such as quebracho or sulfomethylated quebracho.

To be effective in the wide variety of situations encountered during the secondary recovery of oil, any composition intended for plugging zones of high fluid permeability within the oil-bearing stratum must meet numerous requirements. The plugging solution must be sufficiently heat stable to plug the high-permeability zones at the temperatures of 60° C. or more often encountered in oil-bearing strata. In addition, since brine is present within many oil-bearing strata, the plugging solution must be able to gel in the presence of brine and the formed gel must not deteriorate during prolonged exposure to brine. Since the high-permeability zones to be plugged are often still wet with oil, the plugging solution must be able to gel in the presence of residual oil especially in the presence of oil-wet sandstone often encountered in oil-bearing strata, and the gel must be stable in the presence of such oil. The form gel must also be resistant to all conventional flooding liquids, some of which may be used at elevated temperatures, and to steam injected to recover viscous oil from the oil-bearing stratum; this steam may be heated to temperatures of at least 290° C. In order that the plugging solution may be pumped down the well and a considerable distance into the high-permeability zone, the solution should have low viscosity when first made up and should retain this low viscosity for the period (which may be several hours) necessary to pump the solution down a deep well and a substantial distance into the high-permeability zone. Once is position in the zone, the plugging solution should gel rapidly to a gel having a high mechanical strength. It is very desirable that the plugging solution be of a type which permits the operator, by varying the relative amounts of the various components in the plugging solution, to vary the time lag before gelling of the solution begins. Since in some cases it may be desirable to produce only a reduction in permeability of the high-permeability zones, it is desirable that the operator be able to control the composition of the plugging solution in such a manner as to allow only partial plugging of the high-permeability zones, thereby leaving some residual permeability therein. Furthermore, since it may sometimes be difficult to adjust the permeability of the zones to precisely the right degree immediately, it is desirable that it be possible to increase the permeability of the zones containing the plugging solution after the plugging solution has gelled. Finally, since the plugging solution will often be subjected to considerable shear forces as it is pumped into the porous high fluid-permeability zones, it is important that the plugging solution not be affected by such shear forces.

No prior art plugging solution meets all these exacting requirements. Many prior art solutions produce gels of insufficient mechanical strength or will not gel properly in the presence of brine or residual oil. Moreover, many prior art plugging solutions are so viscous that it is difficult to pump them with sufficient speed and they are susceptible at least partial gelling before they have penetrated the high-permeability zones. In most cases, it is difficult to control the time lag before gelling of the plugging solutions occurs, so that gelling may occur before the plugging solution has penetrated beyond the bottom of the well, which may involve the expensive process of sinking a new well into the oil-bearing stratum. Finally, as shown below, prior art solutions based upon high-molecular weight polymers are susceptible to physical degradation by shear stresses, so that the shear stresses encountered during pumping of these plugging solutions into porous strata will greatly reduce the strength of the gel finally produced.

It will therefore be seen that there is a need for a method of plugging high-permeability zone in oil-bearing strata which fulfills all of the above-mentioned requirements, and the instant invention provides such a plugging method.

SUMMARY OF THE INVENTION

Accordingly, the invention provides several methods for adjusting the fluid permeability of a high fluid permeability zone in an oil-bearing stratum, this zone having greater fluid permeability than the surrounding zones of the oil bearing stratum. In these methods, there is injected into the oil-bearing stratum via a well penetrating the stratum an aqueous, alkaline gelable solution. This solution comprises an alkaline material, a polyphenolic vegetable materials which may be a tannin extract, a catechin or an alkaline extract of a coniferous tree bark. The polyphenolic material used must be soluble in alkaline solution. The gelable solution also contains formaldehyde, present as formaldehyde itself, paraformaldehyde, urea-formaldehyde concentrate, hexamethylenetetramine or a phenol-formaldehyde resole. The gelable solution has a pH of at least about 9.5 and a total active solids content of about 1 to about 33% by weight. The gelling time of the gelable solution and the rate of injection of this solution into the oil-bearing stratum are arranged so that the solution passes down the well by which it is injected and achieves substantial penetration into the high fluid permeability zone before substantial gelling occurs. Thereafter, the solution is allowed to gel within the high-fluid permeability zone, thereby reducing the fluid permeability of this zone. Obviously, the zone can thereafter be treated with flooding fluid and oil recovered from the oil-bearing stratum by conventional techniques.

In the first instant method, the gelable solution is formed by dissolving the alkaline material, the polyphenolic vegetable material and the formaldehyde in a brine containing not more than about 0.275% by weight of cations having a valency greater than one and forming insoluble hydroxides. In the second instant method, the oil-bearing stratum treated is one containing cations capable of causing the formation of insoluble material when in contact with the gelable solution so that injection of the gelable solution into the oil-bearing stratum causes the formation of this insoluble material to occur at the interface between the high fluid permeability zone and the surrounding zones, thereby limiting the penetration of the gelable solution into the surrounding zones.

In the third instant method at least part of the akaline material used to form the gelable solution is an alkali metal carbonate. After injection, the gelable solution is allowed to gel within the high fluid permeability zone, thereby reducing the fluid permeability of this zone and thereafter an acid is injected into the high fluid permeability zone to dissolve at least part of the alkali metal carbonate. This use of alkali metal carbonate followed by treatment of the gelled solution with acid allows the operator to adjust the final permeability of the original high fluid permeability zone.

In a fourth instant method the source of formaldehyde in the gelable solution must comprise hexamethylenetetramine. This fourth method is primarily intended for use when the temperature of the oil-bearing strata is considerably above room temperature e.g. above about 40° C. and preferably somewhat higher.

The invention also provides a composition for adjusting the fluid permeability of a high fluid permeability zone in an oil-bearing strata. This composition is an aqueous gelable solution having a pH of at least about 9.5 and containing an alkaline material, a polyphenolic vegetable material (which may be a tannin extract, a catechin or an alkaline extract of a coniferous tree bark). The polyphenolic vegetable material must be soluble in alkaline solution. Finally, the composition comprises hexamethylenetetramine. The total weight of the alkaline material, polyphenolic vegetable material and hexamethylenetetramine in the solution if from about 1 to about 33% by weight of the solution.

Finally, this invention provides a composition for use in preparing the gelable solution used in the fourth instant method, this composition comprising an alkaline material, a polyphenolic vegetable material soluble in alkaline solution, this polyphenolic vegetable material being a tannin extract, a catechin or an alkaline extract of a coniferous tree bark, and hexamethylenetetramine.

The term "total active solids content" used herein in relation to the gelable solutions used in the instant method refers to the total content of alkaline material, polyphenolic vegetable material, formaldehyde (in whatever form the formaldehyde is present) and sodium chloride (if any) in the gelable solutions. As described below, the presence of sodium chloride in the gelable solutions significantly affects their gel times and thus, although sodium chloride is not a reactant in the gel-forming reaction, it is an active component in determining the gel times of the solutions. The solutions used in the instant method may also contain various minor additives, such as preservatives and anti-dusting agents, but these additional minor additives have no significant effect and the gel times of the solutions and are thus excluded when calculating the total active solids content of the solutions.

After the fluid permeability of the high fluid permeability zone has been adjusted by the method of the invention, a flooding fluid may be injected into the oil-bearing stratum, thereby enabling oil to be recovered from the oil-bearing stratum. This flooding fluid may be of any conventional type, for example water, brine, an aqueous solution of a polymer, an aqueous solution of a surfactant or a hydrocarbon fluid.

DETAILED DESCRIPTION OF THE INVENTION

Figure 1:
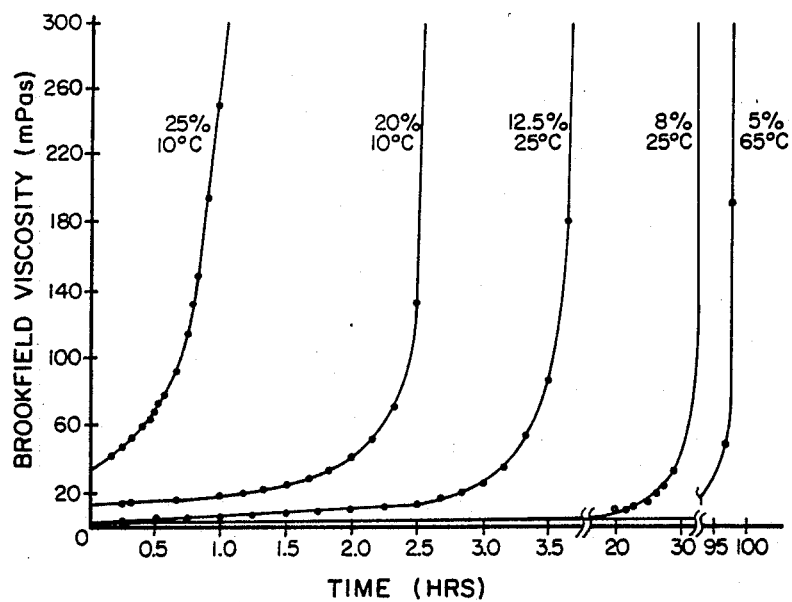
FIG. 1 shows graphs of viscosity against time for various gelable solutions used in the instant invention at varying solids contents and at varying temperatures.

Gelable solutions similar to those used in the instant methods are described in U.S. Pat. Nos. 3,686,872 and 3,884,861, both issued to Whitworth et al. The disclosures of both these patents are herein incorporated by reference. The patents describe the use of compositions containing an accelerator for stabilizing soil. It should be noted that requirements for a soil-stabilizing composition are much less stringent than for a composition for reducing the permeability of high fluidpermeability zones in oil-bearing strata. Soil-stabilizing compositions are not required to gel in the presence of brine or residual oil, since such substances are not usually present in soil being stabilized. Furthermore, the time lag before gelling is much less critical in soil-stabilizing compositions than in compositions for use in oil-bearing strata since the former do not have to be pumped long distances, being injected directly into the soil to be stabilized. Indeed, the compositions described in both Whitworth et al. patents are accelerated compositions containing a metal or silicon gelling accelerator to ensure that the solution gels within a few minutes. Such a rapidly-gelling composition is not suitable for treatment of the majority of oil-bearing strata, since it would gel in the well through which it was being injected long before it reached the desired high-permeability zones. Furthermore, the shape of the viscosity-against-time curve for a soil-stabilizing composition is of little consequence, since the composition is usually injected into the soil to be stabilized immediately after the composition has been formed, so there is little or no need for the composition to remain non-viscous for any protracted period. As explained above, gelable solutions used to treat deep oil-bearing strata must remain substantially non-viscous for a period of several hours in order to ensure that they can be pumped at an adequate rate into the deep strata. Again, because of the elevated temperatures found in oil-bearing strata, gelable solutions for use therein must be capable of gelling at various elevated temperatures, whereas soil-stabilizing compositions do not need to be gelable at elevated temperatures, since soil temperatures will normally be less than about 20° C. Indeed, one of the advantages claimed for the accelerated compositions described in the aforementioned Whitworth et al. patents is their ability to gel rapidly at temperatures just above freezing point. Finally, since the fluid permeability of stabilized soil is of little or no consequence, a soil-stabilizing composition does not need to be capable of reducing but not completely eliminating the fluid permeability of an originally high-permeability zone. For all these reasons, a composition used for soil-stabilizing is not necessarily suitable for blocking high-permeability zones in oil-bearing strata, and indeed the great majority of the compositions used for soil-stabilizing are useless for reducing permeability in oil-bearing strata.

The alkaline gelable solutions used in the instant methods must, as already stated, have a pH of at least about 9.5. Preferably the pH of the gelable solution is between about 10 and 11, since above about pH 11 gelation tends to be inhibited, whereas below pH 9.5 precipitation of the polyphenolic vegetable material may occur leaving a non-gelable solution. Obviously, after injection into the oil-bearing stratum, the gelable solution may be diluted by liquid already present in the stratum, which liquid may have a pH substantially different from that of the gelable solution. If it is though likely that mixing of the gelable solution with fluid already present in the oil-bearing stratum will reduce the pH of the gelable solution below about 9.5, an alkaline solution having a pH of above 9.5 may be injected into the oil-bearing stratum before the gelable solution in order to prevent such lowering of the pH of the gelable solution after injection.

The alkaline material suitable for use in the gelable solution used in the instant methods may be any alkaline material which will produce a sufficient pH and which does not adversely effect the gelling properties of the polyphenolic vegetable material/formaldehyde mixture. Preferred alkaline materials include sodium hydroxide, potassium hydroxide, sodium carbonate and potassium carbonate. For reasons explained below, where it is desired that the final permeability of the originally high-permeability zone be capable of being adjusted after treatment by the instant methods, it is preferred that at least part of the alkaline material in the gelable solution be a carbonate.

The amount of alkali needed in the gelable solution to obtain the desired pH depends on the particular polyphenolic vegetable material used. If, for example, the polyphenolic material is an alkaline extract, it will be largely in the form of sodium salts of the polyphenolic vegetable material and only relatively small amounts of alkali may be required to raise the pH of such a solution above 9.5.

Polyphenolic vegetable materials suitable for use in the instant methods include vegetable tannins such as those extracted from mimosa, quebracho, mangrove and wattle; catechin and chatechu such as those extracted from *Acacia catechu* and *Acacia suma*, mahogany wood and the like; the alkaline extracts of certain coniferous tree barks including the barks of Weston Hemlock, Douglas Fir, White Fir, Sitka Spruce and Southern Yellow Pine, particularly such extracts prepared as described in U.S. Pat. Nos. 2,782,241, 2,819,295 and 2,823,223; and vegetable tannin extracts obtained from *Eucalyptus crebra*, *Callitris calcarata* and *Callitris glauca*. The preferred polyphenolic vegetable material for use in the instant methods is that readily available in commerce as Mimosa Tannin Extract, which is extracted from *Acacia mollissima*.

The exact chemical composition of many of the commercially available polyphenolic vegetable materials is not known, but the aforementioned materials are known to possess three properties necessary in the gelable solutions used in the instant method, namely solubility in alkaline solutions, ability to combine with formaldehyde, and ability to form a gel with formaldehyde. The ability to combine with formaldehyde is conveniently measured as the number of grams of formaldehyde which react in four hours with 100 grams of the dry polyphenolic vegetable material dissolved in an aqueous solution of pH 9.5. We prefer to use polyphenolic vegetable materials having a formaldehyde combining capacity of at least 5.0.

The gelable solution used in the instant methods has a total active solids content of from about 1 to about 33% by weight of the solution. Above about 33% by weight of these materials, the solution tends to gel too rapidly to be practically useful, while below about 1% by weight the solution is too slow to gel or may not gel properly at all. Where it is desired to reduce the permeability of high fluid-permeability zones, but not to completely eliminate all permeability thereof, it may be desirable to use a gelable solution containing from about 1 to about 10% by weight of these materials. Preferably, the gelable solution contains from about 15 to about 25 parts by weight of formaldehyde per 100 parts by weight of the polyphenolic vegetable material on a dry basis.

The gel time of the solutions used in the instant methods depends upon a number of factors, including the total active solids content of the gelable solution, the exact components and proportions of the various components in the gelable solution, the temperature of the oil-bearing stratum in which gelling takes place and the quantity of ions which are either deliberately introduced into the gelable solution or which becomes admixed with the gelable solution because of the presence of brines in the oil-bearing stratum. Although, as those skilled in the art are aware, final selection of the various parameters used in the instant method is to a certain extent dependent upon the skill and judgement of the operator, certain general principles for guidance in selection of these parameters can be set forth. In general, the higher the total active solids content of the gelable solution used, the shorter is the gel time and the lower the final permeability obtained in the originally high fluid permeability zone. Higher temperatures in the environment in which the gelling takes place i.e. in the oil-bearing stratum, the lower the gel times. Also, as explained in more detail below, the presence of polyvalent cations in the gelable solutions tends to reduce gel times, whether those polyvalent cations are introduced into the gelable solution by making the gelable solution up using a brine in accordance with the first instant method, or whether such polyvalent cations are introduced as the gelable solution becomes admixed with brine present in the oil-bearing stratum.

The urea-formaldehyde concentrate which can be used as a source of formaldehyde in the gelable solutions used in the instant methods is commercially available and is manufactured by adsorbing gaseous formaldehyde into an aqueous solution of urea. This urea-formaldehyde concentrate has the advantage that, whereas simple aqueous solutions of formaldehyde containing more than about 50% formaldehyde are unstable and likely to polymerize, the urea-formaldehyde concentrate contain considerably greater concentrations of formaldehyde and still have long term storage stability.

Using hexamethylenetetramine as the formaldehyde source in the gelable solutions normally produces solutions have longer gel times than similar solutions in which formaldehyde, paraformaldehyde or a phenylformaldehyde resole is used as the source of formaldehyde. Moreover, it appears (although the invention is in no way limited by this belief) that the way in which hexamethylenetetramine produces gelling is somewhat different from that in which formaldehyde, paraformaldehyde, and phenyl-formaldehyde resoles produce gelling. Paraformaldehyde is unstable in water and thus when the gelable solutions made up using paraformaldehyde the paraformaldehyde dissociates to form free formaldehyde in the solution. Accordingly, when either formaldehyde or paraformaldehyde is used as the formaldehyde source, the solution as originally formed contains substantial concentration of formaldehyde and thus, in principle, begins to gel as soon as it is formed, although as illustrated in the examples below, no perceptible change in gelling properties takes place for a considerable period. Phenol-formaldehyde resoles do not hydrolyze in the gelable solutions, but in this case the reactive entity responsible for the gelling reaction is the methylol groups of the resole and these reactive groups present from the formation of the gelable solution. Thus, in all cases at least in principle geling of the gelable solution begins as soon as this solution is formed.

However, although free formaldehyde produced by hydrolysis appears to be the effective gelling agent in gelable solutions containing hexamethylenetetramine, hexamethylenetetramine is much less labile than paraformaldehyde and the rate at which hexamethylenetetramine is hydrolyzed to free formaldehyde and ammonia in aqueous solution is negligible at room temperature. For practical purposes, the gellable solutions containing hexamethylenetetramine are stable indefinitely at room temperature since in the absence of free formaldehyde no gelling reaction takes place. Hydrolysis of the hexamethylenetetramine to formaldehyde and ammonia to an extent sufficient to produce significant gelling reactions only takes place when the gelable solution is raised to a temperature substantially above room temperature, in excess of 40° and preferably more than about 50° C., such as would normally occur when the gelable solution is injected into oil-bearing stratum a substantial distance below ground. Accordingly, the use of gelable solutions containing hexamethylene tetramine is not recommended where the oil-bearing stratum is relatively cool, for example because large quantities of flooding liquid have previously have passed through the stratum. On the other hand, compositions containing hexamethylenetetramine may be highly desirable for use in relatively hot oil-bearing stratum where other gelable solutions might tend to gel so quickly that proper penetration of the gelable solution into the high fluid permeability zone would not be achieved before gelling occured.

We prefer that the formaldehyde used in the instant gelable solutions be present as paraformaldehyde, since this solid material is easier to handle and store than liquid solutions of formaldehyde (formalin solutions) or urea-formaldehyde concentrate. However, for the reasons stated in the proceeding paragraph, gelable solutions based on hexamethylenetetramine as the formaldehyde source may be especially useful under certain conditions.

The gelable solutions used in the instant method have relatively low viscosity when first prepared, in the range of about 2 to about 30 mPa.s depending upon the solids content of the solution and the temperature. These viscosities render the gelable solutions easy to pump and capable of rapid injection into the oil-bearing stratum. Furthermore, as shown for example, by the data in FIG. 1, discussed in detail below, the viscosity of the gelable solutions remains substantially unchanged for relatively long period, which may be up to about 100 hours, thus enabling the solutions to be pumped for a protracted period without risk of them gelling at an undesired location. At the end of this time, the viscosity of the gelable solutions increases very rapidly and a gel of substantial mechanical strength is formed. The ability of the gelable compositions used in the instant method to remain non-viscous for protected periods and then to form a strong gel very rapidly is particularly useful for selective plugging of high-permeability zones at some distance from the bottom of the well through which they are injected into the oil-bearing stratum. Since it is usually desirable to reduce or eliminate the fluid permeability of a high-permeability zone lying some distance from the well through which the gelable solution is injected into the oil-bearing stratum, a non-gelable displacing fluid should normally be injected into the oil-bearing stratum after the gelable solution has been injected and through the same well, thus causing the gelable solution to be displaced from around the well through which it was injected and preventing excessive loss of permeability around the bottom of this well. The displacing fluid used in this procedure may be water or a viscous aqueous solution of a polymer; suitable polymers performing such viscous aqueous solutions are well-known to those skilled in the art.

As already mentioned, oil-bearing strata frequently contain brines, typically comprising solutions of sodium, calcium and magnesium chlorides. As is shown in more detail below, at least some of the gelable compositions used in the instant method will gel satisfactorily in the presence of up to about 5% of total dissolved salts, depending upon the concentration of the gelable solution. Since the gelable solution (initially containing little or no dissolved divalent ions) will dilute brine present in the reservoir, in practice the instant methods can be used in oil-bearing strata containing brine having considerably more than 5% dissolved slats. Moreover, as described in more detail below, increasing the proportion of alkaline to polyphenolic vegetable material/paraformaldehyde increases the tolerance of the gelable solutions to brine salts.

It is often found that, in brine-containing oil-bearing strata, the concentration of brine is relatively low within the high-permeability zones of the strata, since most of the brine has been washed out of the high-permeability zones by the flooding fluid used during the first part of the secondary oil recovery process, while the concentration of brine remains relatively high in the zones of lower permeability. In the presence of the calcium and magnesium cations usually present in such brines, the gelable solutions used in the instant method form insoluble particles. Accordingly, when such solutions are, by the second instant methods, injected into oil-bearing strata in which the concentration of brine is much lower within the zones of high permeability than within the surrounding zones, the gelable solutions enter the high-permeability zones and cause the formation of insoluble material at the interfaces between the high fluid-permeability zones and the surrounding zones, where the gelable solutions come into contact with the brine in the latter zones. The resultant deposition of insoluble material at these interfaces limits the penetration of the gelable solution into the surrounding zones, thereby improving the containment of the gelable solution within the high permeability zones and ensuring that the gelable solution does not substantially invade oil-bearing unswept zones If little or no flooding of the high permeability zones has taken place prior to use of the instant method, fresh water may be injected into the oil-bearing stratum before the gelable solution is injected and through the same well or wells to lower the brine concentration within the high permeability zones, thereby ensuring that, when the gelable solution is injected, the gelable solution will be confined to the high permeability zones for formation of the insoluble material, as described above.

Because the gelable solutions are tolerant of brine, if it is desired to carry out the instant method in a location e.g. a desert where procuring sufficient fresh water to make up the gelable solutions is difficult or costly, the gelable solutions may, as already mentioned, be prepared by dissolving the alkaline material, the polyphenolic vegetable material and the formaldehyde source in a brine (which might be a brine derived from the oil reservoir), provided that the brine does not contain more than about 0.275 weight percent of cations, such as magnesium cations, having a valency greater than one and forming insoluble hydroxides.

As is well-known to those skilled in the art, although the main salt component in reservoir brines is sodium chloride, the monovalent sodium cation has little effect on the gelling of gelable solutions and the change in geling of the solutions and the formation of insoluble material is mainly caused by the divalent cations, such as calcium and magnesium present in the bines. The presence of (say) 1-2% by weight of sodium chloride in the instant gelable solutions is not deleterious, although it may affect their gel times somewhat.

As indicated above, by careful adjustment of the concentrations of the various components in the gelable solution, the instant method may be carried out so that gels are formed which do not completely destroy the permeability of the treated part of an oil bearing strata but only reduce the permeability of this part. This is advantageous, since such reduction but not elimination of the permeability of the treated part eliminates the possibility of inadvertently and completely stopping the flow of flooding liquid through the oil-bearing stratum. This is highly undesirable, since complete blockage of flooding liquid flow would necessitate the expensive drilling of a new injector well into an unblocked part of the oil-bearing stratum or fracturing of the original injector well. To produce such incomplete blocking of the treated part of the oil-bearing stratum, in most cases it is desirable to use a gelable solution in which the total weight of the alkaline material, the polyphenolic vegetable material and the paraformaldehyde is from about 1 to about 10% of the weight of the gelable solution. In some situations, however, gelable solutions containing as little as 1% total active solids may not produce sufficient blocking. Accordingly, in generally we prefer to use gelable solutions containing at least 2% total active solids. Where substantially complete blocking of the high fluid permeability zone is desired, it is generally necessary to use gelable solutions containing at least 5% total active solids, but obviously this depends upon the exact nature of the gelable solution and the properties of the high fluid permeability zone being treated.

The sand or other minerals present in the high permeability zone treated by the instant method often contain oil. Fortunately, the gelable solutions used in the instant method are capable of achieving substantially complete gelation even in the presence of oil-containing minerals. The aqueous gelable solutions cannot wet or adhere to the oil-containing minerals, so that the presence of such oil-containing minerals prevents the gelable solutions from forming a truly consolidated mass within the high permeability zone, the solution instead gelling in the interstitial voids between the oil-containing grains of mineral. However, the permeability o f the high permeability zones can be greatly reduced, in most cases by a factor of about 50, and such marked reduction in permeability is sufficient in most case.

The third instant method also allows the permeability of the treated part of the oil-bearing stratum to be adjusted after the gelable solution has gelled. For this purpose, at least part, and preferably the major part, of the alkaline material in the gelable solution should be in the form of a carbonate. After such a gelable solution has gelled, a strong acid, preferably a mineral acid and most desirably hydrochloric acid, in injected into the treated part of the stratum, whereupon part of the carbonate is dissolved from the gel, thereby increasing the permeability of the treated part of the stratum. If necessary, the acid treatment may be repeated, and when the desired permeability has been achieved, the treated part of the stratum is flushed with water or some other flooding liquid to remove the acid from the treated part, thereby preventing further reaction between the acid and the gelled solution and consequent further increase in the permeability of the treated part.

In cases where the permeability of the high permeability zones in the oil-bearing stratum is very great, or where the ratio between the high permeability zones is relatively low, it may be found that the use of a gelable solution containing only an alkaline material, a polyphenolic vegetable material and paraformaldehyde causes an excessive rate of material dissipation within the oil-bearing stratum and, if brine is present in the stratum, excessive dilution of the gelable solution with the brine and consequent difficulty in obtaining proper gelling. To limit the dissipation of the gelable solution in such situations, it is advantageous to add to the gelable solution a small quantity of a viscosifier, preferably a polymer and most desirably poly(sodium acrylate) or its copolymers. From 0.1 to 1% by weight of the gelable solutions of poly(sodium acrylate) usually gives satisfactory results; those skilled in the art will be aware of numerous other types of viscosifiers suitable for use in plugging solutions and the quantities in which such viscosifiers should be used. Other possible viscosifiers include carboxymethylcellulose and other cellulose derivatives and polysaccharides. However, because of the difficulties associated with pumping highly viscous gelable solutions into the oil-bearing stratum, we prefer to avoid the use of viscosifiers if possible.

As already mentioned, in most cases the gelable solutions used in the instant method should not contain any accelerators, since it is desirable to have a period of several hours before the solutions gel, in order to allow for pumping the solutions down deep wells and substantial distances into the high permeability zones. However, in a minority of cases there may be very large fractures or channels, through which fluids can flow very quickly, within the oil-bearing stratum. Where such large fractures or channels are present, the use of a non-accelerated gelable solution may result in such excessive dissipation of the gelable solution that no substantial reduction in permeability of the large fractures or channels occurs. In such cases, it may be necessary to carry out the instant method using an accelerated gelable solution. The accelerator used may be of any of the types described in the aforementioned U.S. Pat. Nos. 3,686,872 and 3,884,861, that is to say a gelling agent soluble or colloidally dispersible in the gelable solution and containing a complexing element, this element being silicon, vanadium, molybdenum, manganese, titanium, copper, zinc or zirconium. The preferred accelerator is an alkali metal silicate, preferably sodium silicate, and such a silicate is preferably added to the gelable solution in an amount of from about 0.1 to about 6.5% of the weight of the polyphenolic vegetable material in the solution.

By the use of such accelerators, the gelling time of the gelable solution can be reduced to as low as about 10 seconds. Obviously, it is not practical to pump such rapidly-gelable solutions over substantial distances, and thus in order to ensure that the gelable solutions reach the desired location in the short period before they gel, the gelable solution and a solution of the accelerator, are pumped separately down the or each well used for injecting the gelable solution and allowed to mix within the well at a point spaced from the upper end thereof to form the rapidly-gelling solution. Such a procedure avoids the waste of gelable solution which would be incurred if it were necessary to use a slowly-gelling solution to seal such large fractures and channels. When using such rapidly-gelling solutions, it is often advantageous to add a viscosifier to one or other of the solutions pumped down the well so that the accelerated gelable solution formed upon mixing the two solutions has high viscosity and flows in a piston-like manner through the high-permeability zones, since this flow pattern results in a more effective blocking of the high-permeability zones after the solution gels.

Alternatively, instead of adding an accelerator to the gelable solution itself, a solution of an accelerator may be injected into the high-permeability zone(s) either before or after the gelable solution is introduced into the zone(s).

As shown by the examples below, the gelable solutions used in the instant method having a total active solids content of at least about 5% and using sources of formaldehyde other than hexamethylenetetramine are capable of maintaining, at temperatures up to at least about 65° C., gel times sufficiently long to allow for handling and desirable penetration into oil-bearing strata. A substantial proportion of oil-bearing strata do not exceed this temperature. The instant method can still be used in oil bearing strata above this temperature if a very short gel time is desirable. If the stratum to be treated is above 65° C., either because of natural geological heat or because steam or other hot fluid has previously been injected into the stratum to effect secondary recovery of oil, it may be necessary to inject a supply of cooling fluid into the oil-bearing stratum before the gelable solution is injected, in order to cool the stratum to a temperature at which a satisfactorily long gel time can be achieved. Also, gelable solutions having active solids contents below 5% and/or using hexamethylenetetramine as the formaldehyde source tend to be slower in gelling than the other instant gelable solutions and hence it may be possible to use these solutions at temperatures in excess of 65° C.

Once a gelled solution has been achieved by the instant method, the resultant gels are capable of withstanding temperatures much high than 65° C. and in fact can stand prolonged exposure to temperatures as high as 290° C. without substantial deterioration. Accordingly, the instant method can be used to reduce the permeability of zones in oil-bearing strata where it is desired to subsequently inject steam into the oil-bearing stratum in order to recover heavy oil therefrom. This is a considerable advantage of the instant method, since the gels formed by most prior art gelable solutions are not capable of withstanding the temperatures reached in oil-bearing strata during steam recovery of heavy oils.

EXAMPLE 1

This example illustrates the variation in the gel times of the gelable solutions used in the instant method with temperature and with the total concentration of alkaline material, polyphenolic vegetable material and paraformaldehyde in the gelable solutions.

The gelable solutions used in this and subsequent Examples were prepared from a dry powder comprising:

|  | Parts by Weight |
| --- | --- |
| Mimosa tannin extract | 75.2 |
| Paraformaldehyde | 13.2 |
| Sodium chloride (filler) | 10.4 |
| Dowicide A | 0.04 |
| Carnea oil | 0.24 |
| Dibutyl phthalate | 0.92 |

Dowicide A is a preservative and mildewicide while Carnea oil an dibutyl phthalate are used as antidusting agents; neither component significantly affects the gelling of the solutions of the powder. The powder was prepared in accordance with the aforementioned U.S. Pat. Nos. 3,686,872 and 3,884,861. To prepare a solution designated X% below, 0.1X parts by weight of sodium hydroxide were dissolved in (100−1.1X) parts by weight of water and, after the sodium hydroxide had completely dissolved, X parts by weight of the dry powder were then slowly added to the alkaline solution with rapid stirring. After all the powder had been added, the solution was then stirred for 15 minutes to ensure homogeneity, brought to the temperature at which its gel time was to be tested and the gel time measured from the end of the 15 minute mixing period.

Because of the amount of Dowicide A, Carnea oil and dibutyl phthalate in the dry powder, the total active solids content (i.e. the total concentration of alkaline material, polyphenolic vegetable material, paraformaldehyde and sodium chloride) in the various solutions was not precisely equal to the nominal percentage solution, though the differences are small enough to be ignored for practical purposes. For example, the nominally 15% solution comprised 83.5 parts by weight of water, 1.5 parts by weight of sodium hydroxide, 11.28 parts by weight of mimosa tannin extract, 1.98 parts by weight of paraformaldehyde and 1.56 parts by weight of sodium chloride, so that the total active solids content therein was 16.32% (i.e. the total concentration of mimosa tannin extract, paraformaldehyde, sodium chloride and sodium hydroxide) rather than 15%.

Nominally 5%, 8%, 12.5%, 15%, 20% and 25% solutions were made up by this method. The gel times of the various solutions was then determined at temperatures ranging from about 10° C. to 65° C. Over the temperature range 25°-40° C., the viscosity of the gelable solutions was determined using a commercialy-available "Tecam" gel timer, while outside this temperature range the gel time was determined by visual observation. FIG. 1 shows viscosity against time curves for the 5% solution at 65° C., the 8% and 12.5% solutions at 25° C. and the 20 and 25% solutions at 10° C. The curves are cut off arbitrarily at 300 mPa.s because in the final stages of gelation the viscosity was changing so fast that the viscometer readings become unreliable. The viscosity indicated by the viscometer did, however, exceed several thousand mPa.s before complete gelation occurred. As will be seen from the curves in this Figure, the viscosity of the gelable solutions remains almost unchanged for most of the gel time. At the end of the gel time, the originally low viscosity gelable solutions rapidly lost normal fluid characteristics and their viscosity increased very rapidly until they formed a strong gel. It will also been seen from this Figure that increasing temperature tends to decrease the gel time, while increasing the total concentration of alkali material, polyphenolic vegetable material and paraformaldehyde also tends to decrease gel time. Gel times of about 30 minutes to about 100 hours can be produced, as shown in FIG. 1, without using gelling accelerators. The long periods of time in which the viscosity of the gelable solutions remains virtually unchanged allows easy pumping of the solutions into deep wells and through substantial distances into high permeability zones within oil-bearing strata.

Figure 2:
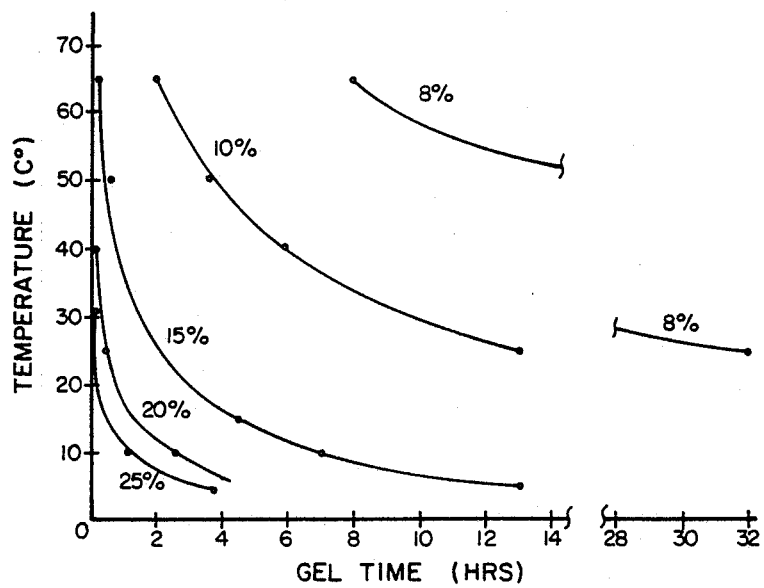
FIG. 2 shows graphs of gel time against temperature for various gelable solutions used in the instant method and having varying solids contents.

FIG. 2 illustrates the variations of gel time against temperature for solutions of constant composition. The curves in this Figure show that in all cases gel time increases with decreasing temperature, but that solutions containing lower total concentrations of alkaline material, polyphenolic vegetable material and para-formaldehyde are more sensitive to temperature variations than those with higher total concentrations of these components. A separate experiment (not shown in FIG. 2) showed that a 5 weight percent solution had a gel time of about 100 hours at 65° C.

EXAMPLE 2

This Example illustrates the effect of brines on the gel times of the gelable solutions used in the instant method.

5%, 10%, 15% and 20% (nominal) solutions were made up in the same way as in Example 1 except that the water was replaced by brines containing sodium chloride, calcium chloride dihydrate and and magnesium chloride hexahydrate in a molar ratio of 20:2:1, the total salt concentration in the brines varying form 0 to 2% by weight. To make up the solutions, the gelable solution was made up in a reduced amount of fresh water and then the requisite amount of a 10% by weight standard brine was added to produce a final solution having the desired total active solids content and brine salts concentration. The gel times of the 10%, 15% and 20% gelable solutions were then determined at 25° C., while the 5% solution was tested at 50° C. The results are shown in FIG. 3, in which the total dissolved solids percentages refer to the solids derived from the brine only.

Figure 3:
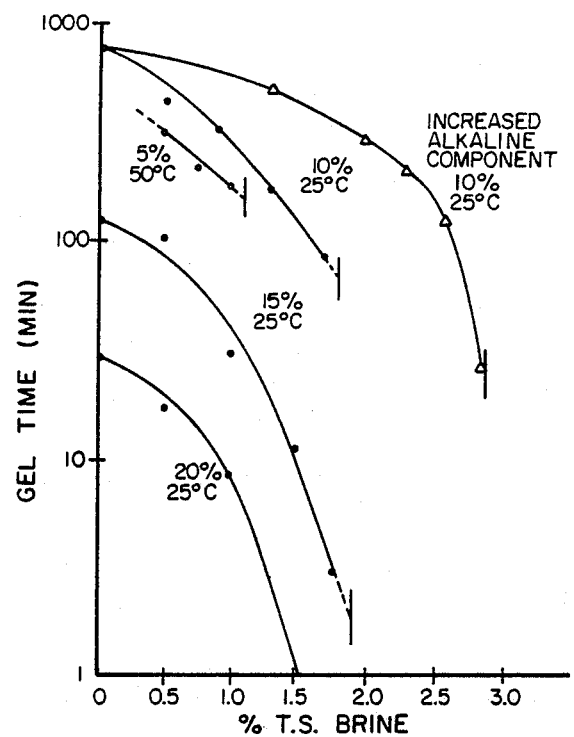
FIG. 3 shows graphs of gelling time against brine concentration for various gelable solutions used in the instant method at varying solids contents and temperatures.

The curves in FIG. 3 show that, within certain limits, the gel time of the solutions decreases rapidly with increasing brine concentration. This decrease in gel time with brine concentration continues until the brine content is such that precipitation of magnesium hydroxide and calcium hydroxide lowers the pH of the gelable solution below the pH range in which the solutions gel properly, namely below about pH 9.5. When the pH falls below about 9.5, precipitation of the polyphenolic vegetable material occurs and a non-gelling composition is produced. The brine concentration at which this phenomena occurs is hereinafter referred to as "no-gel point" and varies according to the total concentration of alkaline material, polyphenolic vegetable material and paraformaldehyde in the gelable solution. The no-gel points are indicated by vertical bars in FIG. 3 and occur at about 1.1% salt content for the 5% solution at 50° C., and about 1.8–1.9 percent for the 10% and 15% solutions at 25° C. At the same temperature, the 20% solution does not display an observable no-gel point since it continues to gel at brine concentrations so large that its gel time falls effectively to zero. When the brine concentration in the 10% solution was increased above the no-gel point the composition formed a wet, non-solidifying sludge. A similar experiment (the results of which are not shown in FIG. 3) with a 25% solution showed that this solution rapidly hardens even at a brine concentration of 7% total dissolved salts to give a gel. However, such a gel is not the strong gel normally formed in the instant method but is a solid of low mechanical strength, crumbling easily under relatively small compressive forces.

As mentioned above, the tolerance of the gelable solutions to brine may be increased by increasing the concentration of alkaline material in the gelable solutions. To illustrate this increase in tolerance of brine with increasing alkaline material content, a series of 10% nominal gelable solutions were made up from the dry powder described in Example 1, fresh water, sodium hydroxide and the 10% aforementioned standard experimental brine using the technique described in the second paragraph of this Example, except that the concentration of sodium hydroxide was increased by the molar equivalent of the calcium and magnesium ions in the final, brine-containing composition. The concentration of the experimental brine was varied to produce from 0 to 3% of the brine salts in the final composition.

The results of this experiment are shown in FIG. 3 as the curve headed "increased alkaline component". As in the experiments previously described, the gel time of this composition decreased with increasing brine concentration, but satisfactory gels were formed up to a brine concentration of about 3.0% total dissolved salts. Thus, by increasing the amount of the alkaline material relative to the other components of the solution, greater tolerance for brine is achieved.

Because of the decrease in gel time with increasing brine concentration, brines of known composition may, if desired, by used to reduce the gel time of the gelable compositions used in the instant method. Furthermore, the foregoing results show that if it is necessary to use brines rather than water to make up the gelable solutions (for example, when operation in a desert area where salt-free water is not readily available) it may be necessary to adjust the amounts of alkaline material, polyphenolic vegetable material and paraformaldehyde in the gelable solutions to compensate for the accelerating effect of the brine.

As will be seen from the composition given above, the curve denoted "Increased alkaline component" in FIG. 3 was derived from a 10% (nominal) gelable solution. Similar experiments carried out using a 25% (nominal) gelable solution showed a no-gel point of 4.5% total dissolved salts. At brine concentrations above the no-gel points for these increased alkaline component solutions, the pH of the solution is still in the proper range but the large mass of insoluble hydroxides formed dispersed throughout the solution prevents it from becoming consolidated into a proper gel. It should be noted that, in all the above experiments, the no-gel points was determined as a function of total dissolved salts in the gelable solution itself. In actual use, provided the gelable solutions are made up with water containing relatively little dissolved salts, the instant method can be carried out in oil-bearing strata containing brine considerably more concentrated than the no-gel points determined above would indicate. Firstly, the brine in the oil-bearing stratum would be diluted by the gelable solution so that the total dissolved solids content of the resultant mixture will be considerably less than that in the brine. Furthermore, as mentioned above, since the brine concentration in the high-permeability zones is usually less than that in the surrounding zones, precipitation of insoluble hydroxide material tends to occur only at the interface between the high-permeability zones and the surrounding zones, and the resultant precipitation of insoluble bacterial at these interfaces tends to limit diffusion of the brine into the gelable solution. Accordingly, the above experiments show that in practice the instant method can be practiced in oil-bearing strata containing brine having a total dissolved solids content of considerably more than 3% and still produce satisfactory gelling within the high-permeability zones. Accordingly, the instant method can be used in practice in most brine-containing oil-bearing strata.

EXAMPLE 3

This example illustrates the use of the instant method to reduce the permeability of an oil-containing high permeability zone in an experimental model.

Figure 4:
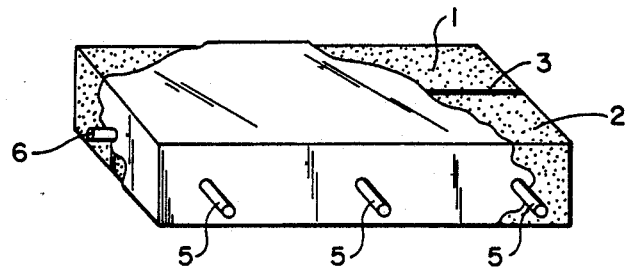
FIG. 4 is a schematic diagram of a sand-propped Berea core used to simulate an oil-bearing stratum having a zone of high fluid permeability, in certain experiments described below.

The experimental model used in illustrated in FIG. 4 and comprises two Berea sandstone cores 1 and 2, each 28.2×2.47×2.73 cm. The two cores were separated by a 0.09 cm. gap 3 propped with 285–325 mesh sand and were enclosed within an impermeable skin 4 of fiberglass saturated with a cross-linked epoxy-based resin to prevent leakage of fluid through the surfaces of the Berea cores. Both of the outer long faces of one of the Berea cores was provided with three transverse fluid-injection tubes 5, and a single longitudinal injection/withdrawal tube 6 is provided at each end of the cores adjacent the sand-filled gap 3 (only one of these longitudinal injection/withdrawal tubes 6 is visible in FIG. 4).

Figure 5:
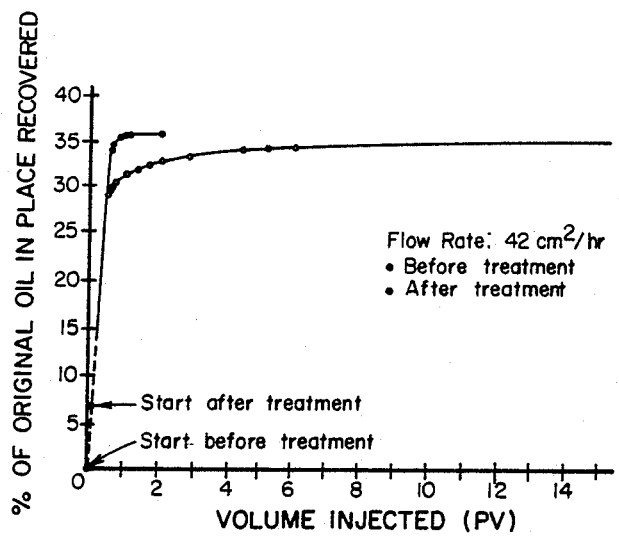
FIG. 5 shows the proportion of original oil recovered from the Berea core shown in FIG. 4 as a function of the volume of water injected thereinto as a flooding fluid.

The cores were first saturated with the standard experimental brine described above containing 6% total dissolved salts and then a 1.3 cps. mineral oil was injected through the transverse tubes 5 under a pressure of 50 psi. (3.52 kg/cm.²). Secondary recovery of the oil was then simulated by injecting water longitudinally into the core via one of the longitudinal tubes 6 at rate of 42 cm.³ per hour (equivalent to a linear water-flow velocity of 3.5 meters per day) until 16 cm.³ of oil (about 33% of the oil present in the core) had been recovered, as shown by the lower curve in FIG. 5. As shown by this lower curve in FIG. 5, further flooding of the core with water produced substantially no further oil recovery.

The permeability, K of the core in millidarcies (md.) was calculated from the standard equation:

$$K = \frac{Qx'\eta \times L \times 1000}{\Delta P \times A}$$

where
Q is the flow rate in cm.³ sec.⁻¹
$\eta$ is the viscosity of the fluid in cps. (mPa.s)
L is the length of the zone being swept in centimeters,
$\Delta P$ is the pressure drop through the zone in atmospheres, and
A is the cross-sectional area of the zone being swept in square centimeters.

At the beginning of the experiment, the effective permeability of the core to brine was determined to be 228 md. Since the estimated effective permeability of the Berea cores was 10 md., the permeability of the sand-filled gap 3 (synthetic fracture) was calculated as 13400 md.

After all the available oil had been removed by the first water flooding, a 10% (nominal) gelable composition produced by the technique described in Example 1, but using a 1.1% total dissolved salts standard experimental brine containing a 20:2:1 by *weight* mixture of sodium, calcium and magnesium ions as the aqueous vehicle, was injected into the core and allowed to set for 22 hours. Although in theory the next step should have been over-displacement of the gelable solution with brine to remove the gelable solution from the injection face of the core, this was found to be unnecessary in view of the small volume of the model core and instead the face of the core through which the gelable solution had been injected was scratched with a drill bit in order to overcome the effects of surface plugging of the core. The permeability of the core to brine following this scratching was found to be 19 md. 6% total dissolved salts standard experimental brine having the same salt ratios as the aforementioned 1.1% brine was then injected to displace the 1.1% brine in order to determine the influence of brine concentration on the permeability reduction effected by the gelled solution. After this flooding with 6% brine, the permeability of the core was found to be 20 md., showing that the 6% brine had almost no effect on the permeability of the core. Next, the core was again saturated with oil, but this time the oil was injected via the longitudinal injection tube 6 and sine the injection pressure was the same as in the first oil injection, but the length of the core in the direction of injection was substantially greater, the pressure gradient in the direction of oil injection was lower, and consequently the resultant oil saturation was lower than in the first oil injection. Accordingly, the amount of oil required to saturate the core was about 3 cm.³ lower than in the first oil saturation. The core was then again flooded with water in the same manner as during the first water flood and the percentage of oil recovered was plotted against the volume of water injected to give the upper curve shown in FIG. 5. As shown in that Figure, the proportion of oil recovered after plugging of the synthetic fracture by the instant method as greater than the proportion recovered before treatment by the instant method. It is especially noteworthy that, during the second water flood, immediately after water flooding began the oil was being recovered at a faster rate than during the first water flood, prior to treatment of the core by the instant method. Although the improvement in oil recovery following plugging by the instant method is not great, this relatively small improvement can be attributed to the fact that Berea sandstone becomes very strongly wet in contact with water, being subject to strong water inbibition, and rock subject to such strong water imbibition can be expected to yield less improvement of oil recovery following plugging of the fracture than would a less strongly water-wettable rock.

The permeability of the plugged core to brine was found to be 46 md. 20 hours after the start of the second oil injection. To determine whether this increase in permeability was due to a deterioration of the gel, the core was left to age for 41 days from the injection of the gelable solution. At this time, the permeability of the core was found to be 34.5 md., indicating that no significant deterioration of the gel had taken place.

EXAMPLE 4

This Example illustrates the ability of the gelable solutions used in the instant invention to gel in the presence of residual oil in a simulated high-permeability zone.

An experimental model of a high-permeability zone was prepared by filling stainless steel tubes having a cross-sectional area of 0.71 cm.$^2$ with Standard Ottawa Testing Sand, ASTM C-190, a river sand supplied by the Canlab Division of McGaw Supply Limited. The sand was then saturated with a mineral oil having a viscosity of 5 mPa.s. The oil-saturated sand was then treated by the instant method with gelable solutions preferred as described in Example 1 at concentrations of 10-25% (nominal). The permeability of the sand was determined both before and after this plugging treatment and it was found that the plugging treatment reduced the permeability by a factor of about 50. In addition, when the tubes were flooded with water after plugging, the oil/water mixture leaving the tubes was only very slightly discolored, thus indicating that all the compositions had achieved substantially complete gelling even in the presence of the oil-saturated sand.

EXAMPLE 5

This Example illustrates the high mechanical strength of the gels formed by the instant method.

An experimental model of a high-permeability zone plugged by the instant method was prepared by filling capillary tubes of 0.105-0.111 or 0.205-0.210 cm. internal diameter by the instant method using gelable solutions prepared as described in Example 1 and having concentrations of 10, 15 and 25% (nominal). Air pressure was then applied to the gel in steps of 1 psi. (0.0704 kg. cm.$^{-2}$) per minute. Similar experiments were carried out using 5 and 7% (nominal) solutions in the aforementioned 1.1% standard brine whose composition is specified in Example 3. The maximum pressure drop sustained by the gel before ejection from the tubes was measured and the yield stress $\tau$ calculated therefrom by the standard equation:

$$t = \frac{D \Delta P}{4L}$$

where
D is the internal diameter of the capillary,
$\Delta P$ is the maximum pressure drop sustained before yielding, and
L is the length of the gel segment in the capillary.
This equation assumes that the fluids involved are incompressible, but this assumption does not involve serious error.

The yield stresses observed in these experiments are shown in Table I below.

TABLE I

| | Yield Stress of Gelled Solution | |
|---|---|---|
| | Solution Yield Stress | |
| Concentration | (kPa) | (psi.) |
| 5 | 0.011 | 0.0016 |
| 7 | 0.16 | 0.023 |
| 10 | 0.45 | 0.066 |
| 15 | 0.90 | 0.13 |
| 25 | 5.4 | 0.79 |

The data in the above table show that the yield stress of the gelled composition increases in proportion to the total concentration of alkaline material, polyphenolic vegetable material and formaldehyde in the gelable solution used. The maximum yield stress values were achieved within two days of gelation except for a 5% gel forming solution in the aforementioned standard brine containing 1.1% total dissolved salts; the latter solution took about seven days to achieve maximum yield stress.

EXAMPLE 6

This Example illustrates the improvement in oil recovery from a heterogeneous formation treated by the instant method.

Figure 6:
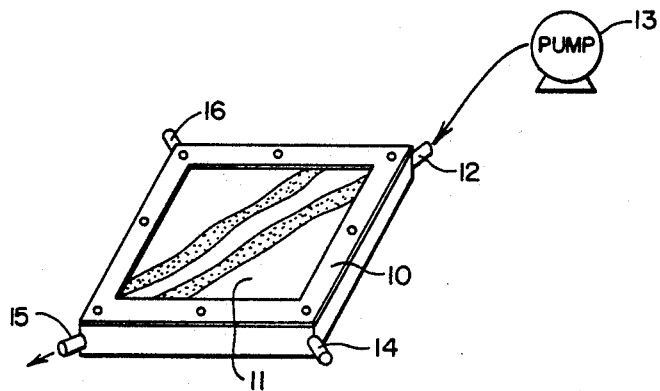
FIG. 6 is a schematic diagram of a sand bed used in certain experiments described below to simulate an oil-bearing stratum having zones of high permeability.

The experimental model of a heterogeneous formation used in these experiments is shown in FIG. 6. The model comprised a square aluminum frame 10 having a cut-out in its upper surface which was closed by a transparent organic glass plate 11 to permit visual observation of the flow patterns within the frame during the experiment. The combined aluminum frame and glass plate were used in two sizes, the larger size defining a square cavity having dimensions of 20.3×20.3×1.27 cm. and the smaller size defining a cavity having dimensions of 15.25×15.25×0.632 cm. Each short edge of each frame was provided with a single tubular port; proceeding clockwise around the frame, these ports were a flooding fluid port 12, used to introduce flooding fluid and connected to a flooding fluid pump 13, an oil injection port 14, a flooding fluid/oil outlet port 15 and a sand filling port 16.

To fill the cavity, the frame was held in a vertical plane with the sand-filling port 16 at the top. Measured quantities of sand were then poured into the unit to create heterogeneous layers of sand within the cavity. In the model illustrated in FIG. 6, three layers of fine, crushed sandblasting sand, obtained from Bell and MacKenzie Company, Ltd. alternated with two layers of the aforementioned Ottawa River sand, to form a heterogeneous sand layer in which the Ottawa River sand streaks acted as two high-permeability zones, since the sandblasting sand had a brine permeability of 770 md. and the Ottawa and a permeability of 65000 md. after tapping and vibration to settle the sand layers. After the sand layers had been filled, the model was returned to a horizontal plane with the glass uppermost.

Water was then injected into the sand layer via the flooding fluid port 12 until the sand layer was saturated, thereby determining the pore volume of the sand layer. Following this water flooding, the zone was flooded via the oil injection port 14 with a 1:1 v/v mixture of Sunpar 107 H and Sunpar 2280 oils, the viscosity of thi mix being 97 cps., as measured by Brookfield LVF #2/60. The volume of water displaced by the oil was measured, thereby determining the amount of oil required to saturate the sand layer.

Following this oil saturation of the sand layer, secondary recovery of oil from the sand layer was simulated by flooding the sand layer with water or brine using as the pump 13 either a Sage syringe pump 355 or a Milton Roy D 82-60 Reciprocating Pump depending upon the required pumping pressure. The water flow rate and the pressure drop across the sand layer were recorded and the water flooding contained until the water:oil ratio of the mixture emerging from the flooding fluid/oil outlet 15 was about 40:1. The rate of water flow through the sand layer was typically about 60 cm.$^3$ per hour.

When the water:oil ratio had risen to about 40, approximately 0.1 times the pore volume of the sand layer of various gelable solutions prepared in the manner described in Example 1 was injected into the sand layer via the flooding fluid port 12 and allowed to gel before water or brine flooding was resumed. Gellable solutions having concentrations of 10-20% (nominal) were used. After the solutions had gelled, the water or brine flooding was continued in the same manner as before and the flooding fluid flow rate, the pressure drop across the sand layer and the water:oil ratio in the liquid leaving the outlet port 15 were noted.

Figure 7:
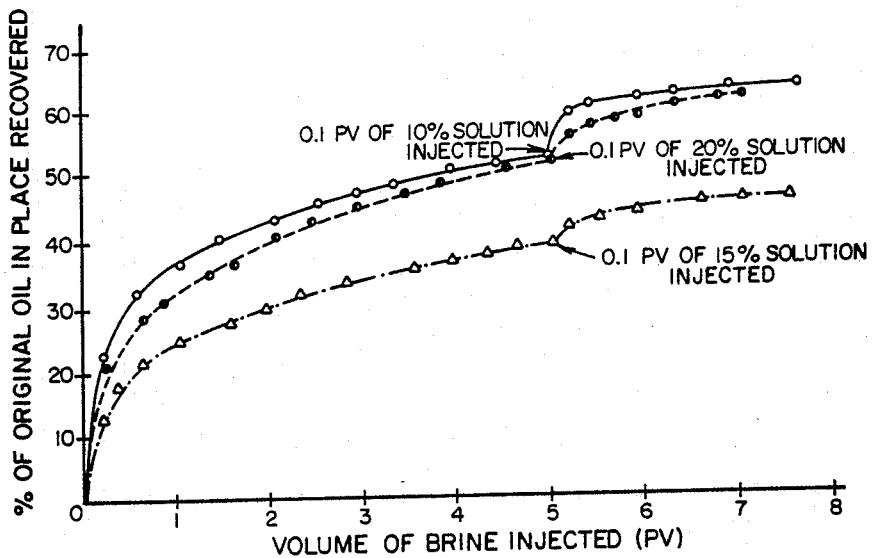
FIG. 7 is a graph showing the proportion of original oil recovered from the sand bed shown in FIG. 5 as a function of the volume of flooding fluid injected thereinto.

FIG. 7 shows the percentage of oil recovery against volume of flooding liquid injected for an experiment using 10, 15 and 20% (nominal) gelable solutions. It will be seen that the proportion of original oil recovered increased substantially following the treatment of the sand layer by the instant method.

Figure 8:
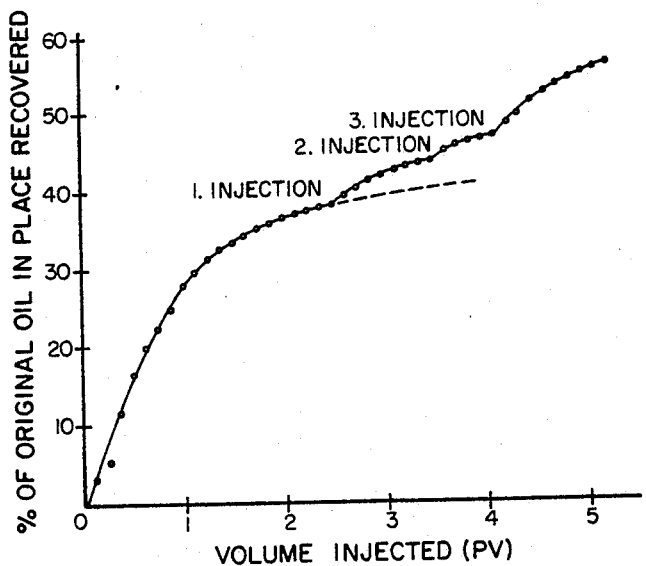
FIG. 8 is a graph similar to FIG. 7 but showing the results of multiple injections of gelable solution into the sand bed shown in FIG. 6.

FIG. 8 shows the results of a further experiment in which multiple treatments by the instant method of a heterogeneous sand layer as shown in FIG. 6 were used to increase recovery of oil therefrom. The experimental technique used was the same as that described above with reference to FIG. 7 except that the sequence of flooding and treatment steps was as follows:
(1) first flooding;
(2) 0.05 times the pore volume of the sand layer of a 2.5% sodium silicate pre-flush solution;
(3) 0.10 times the pore volume of a 20% (nominal) gelable solution;
(4) 0.025 times the pore volume of the same solution as in step (2);
(5) second flooding;
(6) repeat of step (4);
(7) repeat of step (3);
(8) 0.01 times the pore volume of the same solution used in step (2);
(9) third flooding;
(10) repeat of step (1);
(11) 0.075 times the pore volume of a 30% (nominal) gelable solution;
(12) 0.015 times the pore volume of the same solution used in step (2).

FIG. 8 clearly shows that repeated injections of the gelable solution at intervals during the secondary recovery process caused a greater increase in the proportion of oil recovered than a single injection. This is because the second and third injections of gelable solution blocked relatively high permeability zones which were swept clear by the water or brine flooding after the first injection of gelable solution had gelled. After the second and third injections of gelable solution, zones farther and farther from the initial preferred flow path of the flooding liquid were swept.

It was also established in these injections that the portion of oil recovered and the rate of oil recovery are not appreciably affected by the salinity of the displacing fluid, thus proving that once the gelable solutions used in the instant method have gelled, the resultant gels are not affected by prolonged exposure to brine. Accordingly, the when carrying out the instant method, the flood fluid may, if desired, be a brine, and the ability to use brine as a flooding fluid is important since when operating in desert or other locations where large supplies of fresh water are not readily available, the most convenient source of flooding fluid may be brine previously extracted from a producer well and separated from the accompanying oil.

EXAMPLE 7

This Example illustrates the use of gelable solutions containing a viscosifier in the instant method.

Where the permeability ratio between the high-permeability zones and the surrounding zones in an oil-bearing stratum in large (that is to say, where the surrounding zones are relatively "tight"), it is preferred to use a low-viscosity solution in the instant method since such a low-viscosity solution ensures better penetration of the high permeability zones without substantial invasion of the less permeable zones. However, where the permeability ratio between the highpermeability zones and the surrounding zones is smaller, it is desirable to add viscosifiers to reduce the mobility of the gelable solution and to ensure that it preferentially enters the region of highest permeability. Under low permeability ratio conditions, a non-viscosified gelable solution tends to diffuse from the high-permeability zones into the surrounding zones, and this may result in diluation of the gelable solution to such an extent that gelation will not occur, or at least will not occur satisfactorily. This Example illustrates the use of such a viscosified gelable solution.

Figure 9:
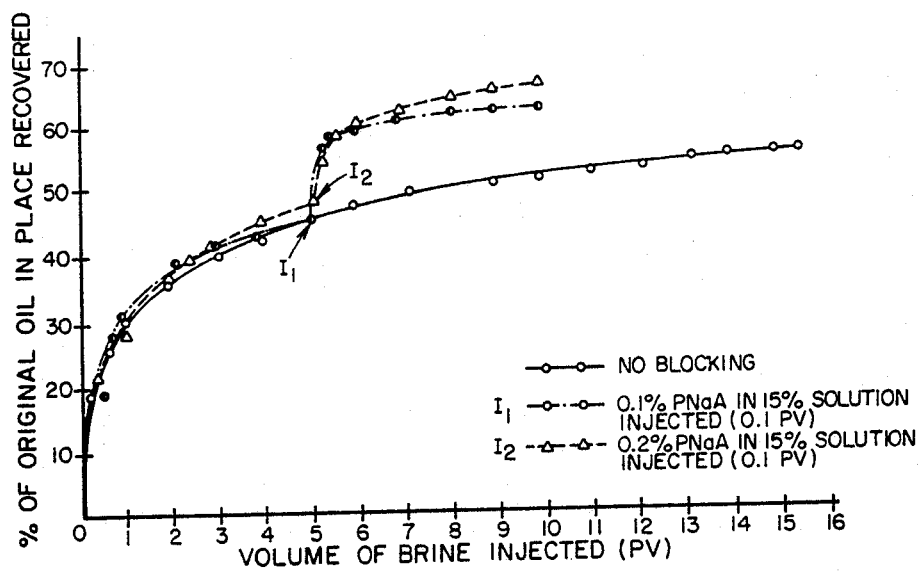
FIG. 9 is a graph similar to FIG. 7 but showing the effects of treating the sand bed shown in FIG. 6 with gelable solutions containing a viscosifier.

The experiments were conducted in the same manner as in Example 6, using 15% (nominal) gelable solutions. However, in these experiments, 0.1% or 0.2% by weight of poly (sodium acrylate), in the form of a commercially available product Polyresin 5544, available from Bate Chemical, was added to each solution. The results are shown in FIG. 9, together with the results of a control experiments in which no gelable solution was used. Comparing FIG. 9 with FIG. 7, it will be seen that the increases in the proportion of oil recovered were larger using the viscosified solutions used in FIG. 9 rather than the non-viscosified solutions used in FIG. 7, because the permeability ratios between the zones in the experimental model were rather low.

Other known viscosifiers, such as carboxymethylcellulose or other cellulose derivatives, polysaccharides, and copolymers of acrylamide, could be used with similar results. The improvement in the proportion of oil recovered at the rate of recovery produced by the addition of these viscosifiers is due to the more precise placing and more complete gelation of the gelable solutions. However, the use of such viscosified gelable solutions does have the disadvantage that pumping pressure has to be increased substantially in order to achieve flow rates with the viscosified solutions comparable to those achieved with the low viscosity, non-viscosified gelable solutions.

EXAMPLE 8

This Example illustrates the use of the instant method to reduce, but not completely eliminate, the permeability of a high permeability zone.

In this Example, a Berea sandstone block having an initial brine permeability of about 116 md. was treated by the instant method with a 5% (nominal) gelable solution prepared in accordance with Example 1. After allowing the gelable solution to gel completely within the sandstone, the brine permeability of the sandstone was reduced to 0.1-0.3 md.

EXAMPLE 9

This Example illustrates the use in the instant method of a gelable solution containing an alkali metal carbonate and the adjustment of permeability of a treated zone with acid after complete gelation has been effected, this acid treatment serving to adjust the permeability of the treated zone.

Figure 10:
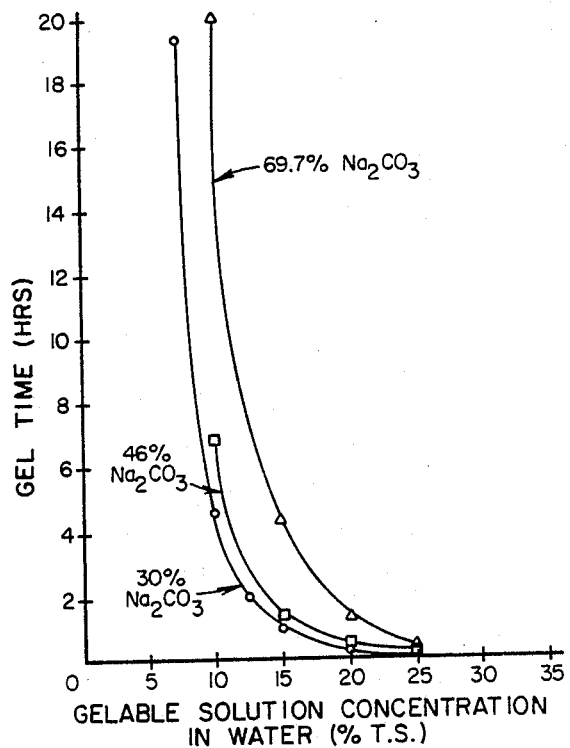
FIG. 10 is a graph showing gel time against solids concentration for various gelable solutions used in the instant method and containing varying amounts of sodium carbonate.

The gelable solutions used in these experiments were prepared in the same manner as in Example 1, and had total concentrations of alkaline material, polyphenolic vegetable material and paraformaldehyde ranging from 7 to 25% by weight, except that the alkaline material used was sodium carbonate instead of sodium hydroxide and the sodium chloride was omitted from the dry powder used to make up the solutions. When making up solutions containing sodium carbonate, it is undesirable to include sodium chloride in the powder since the presence of sodium chloride reduces the maximum amount of sodium carbonate which can be incorporated in the solutions and hence limits the extent to which the gelled solution can be redissolved by acid. Since sodium carbonate is a much weaker alkali than sodium hydroxide, it was necessary to use larger quantities of sodium carbonate, relative to the quantities of polyphenolic vegetable material and paraformaldehyde, and in these experiments the amount of sodium carbonate comprised from 30 to 70% by weight of the total weight of sodium carbonate, polyphenolic vegetable material and paraformaldehyde. For example, the 20% solution used in these experiments contained 80 parts by weight of water, 13.94 parts by weight of sodium carbonate, 5.16 parts by weight of mimosa tannin extract and 0.90 parts by weight of paraformaldehyde, so that 69.79% of the total dissolved solids were sodium carbonate. The gel times of the various compositions were determined in the same manner as in Example 1, the gel times being determined at room temperature (20° C.), and the resuslts are shown in FIG. 10. It will be seen that the sodium carbonate compositions give acceptable gel times, although in the case of such compositions the total concentration of sodium carbonate, polyphenolic vegetable material and paraformaldehyde preferably does not exceed about 15% by weight, since otherwise the gel times tend to be too short. Within the range of sodium carbonate of 30-70% total solids, the higher the proportion of sodium carbonate, the longer the gel time.

Figure 11:
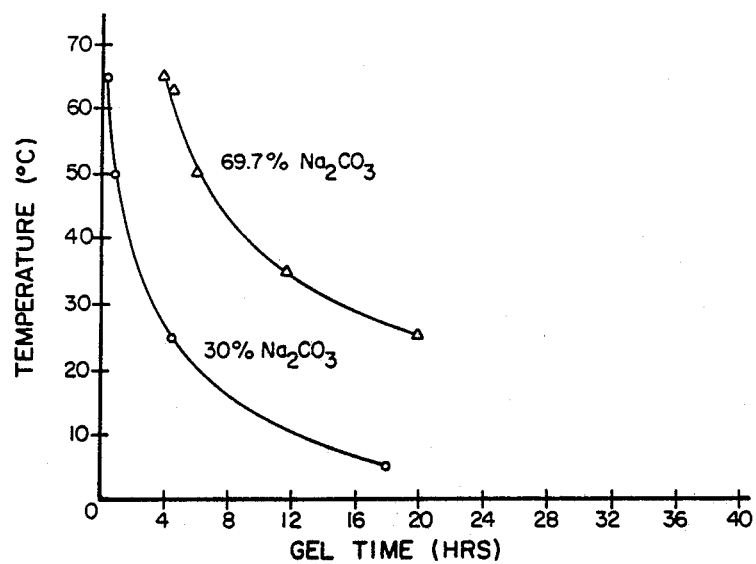
FIG. 11 is a graph showing the variation of gel time with temperature of various gelable solutions used in the instant method and containing varying amounts of sodium carbonate.

A further series of experiments were conducted using carbonate-containing gelable solutions comprising 10% by weight total dissolved alkaline material, carbonate content was either 30% or 69.7% of the total weight of alkaline material, polyphenolic material and paraformaldehyde. The gelling times of these two solutions were then determined in the same manner as in Example 1 over a temperature range of 5°-65° C. The results are shown in FIG. 11, which shows that reasonable gelling times can be achieved over the temperature range of 5°-55° C. As with the hydroxide containing solutions used to prepare the data in FIG. 2, the gel time increases substantially as the temperature decreases and, as in FIG. 10, the greater than ratio of sodium carbonate to polyphenolic vegetable material and paraform aldehyde, the greater the gelling time at a given total solids content.

The ability of the aforementioned composition comprising 80 parts by weight of water, 13.94 parts by weight of sodium carbonate, 5.16 parts by weight of mimosa tannin extract and 0.90 parts by weight of paraformaldehyde to plug porous formations was demonstrated in an experimental model comprising a stainless steel tube 20 cm. in length and having an internal diameter of 0.95 cm. filled with the aforementioned Ottawa sand having a permeability of 65,000 md. A quantity of the gelable solution equal to 1.4 times the pore volume of the tube was injected into the tube at room temperature and allowed to gel completely. After complete gelling, the permeability of the sand was found to be 750 md. A quantity of 20% hydrochloric acid equal to twice the pore volume of the tube was injected into the plugged sand and allowed to remain in contact with the sand for 24 hours, whereafter the acid was flushed from the tube with water and the permeability again measured; the permeability following this first acid treatment was found to be 2400 md. A second acid treatment was then conducted in a similar manner, except that the acid was allowed to remain in contact with the sand for five days before water flushing; the permeability of the sand following this second acid treatment was found to be 3600 md. Thus, this experiment shows that when a high-permeability zone is plugged by the instant method using a gelable solution containing a carbonate, the permeability of the plugged zone can later be substantially increased by treatment of the plugged zone with acid.

EXAMPLE 10

This Example illustrates the thermal stability of the gels formed in the instant method.

The gelable solutions used in this experiment were the solution described in Example 1, 10% (nominal) in tap water, and the solution described in Example 9, containing 80 parts by weight of water, 13.94 by weight of sodium carbonate, 5.16 parts by weight of mimosa tannin extract and 0.90 parts by weight of formaldehyde. Samples of both solutions were allowed to gel in separate glass tubes of 4 mm. internal diameter and in capillaries as previously described in Example 5 and then immersed in the 10% total dissolved solids standard experimental brine described in Example 2 at 290° C. for seven days. After this immersion, the gel samples were tested and their yield stresses were found to show only a negligible decrease as compared with the values before the brine immersion. These results show that the instant method can be used to treat oil-bearing strata containing relatively concentrated brine when it is desired to recover oil from the stratum using steam injection.

EXAMPLE 11

This Example illustrates the advantages of the instant method over the plugging methods described in the aforementioned Swanson U.S. Pat. No. 4,246,124.

Preparation

The gelable compositions used in the instant method may be prepared by the technique described in Example 1 above in about 20–25 minutes. This preparation time does not increase when large batches, such as those necessary under actual field conditions, have to be prepared. In contrast, we have found that preparation of the solutions described in Examples 1 and X of Swanson using Reten 420 as the polyacrylamide and resorcinol and mimosa tannin extract as the phenolic components, requires at least four to six hours, and to achieve proper solution preferably about 16–20 hours. The protracted preparation of the Swanson compositions is a considerable disadvantage under field conditions.

The Swanson compositions were found to have a pH in the range of 7.5–7.8. The relatively low pH of the Swanson compositions proves that their gelling ability is due to a different mechanism from that of the gellable solutions used in the instant method since, as noted above, the gelable solutions used in the instant method will not gel about pH 9.5. In fact, the gelability of the Swanson compositions depends upon the polyacrylamide originally present therein, whereas the gelling of the solutions in the instant method depends upon the copolymerization of the polyphenolic vegetable material and paraformaldehyde to form phenol/formaldehyde copolymers.

Viscosity Against Time Curves

Figure 12:
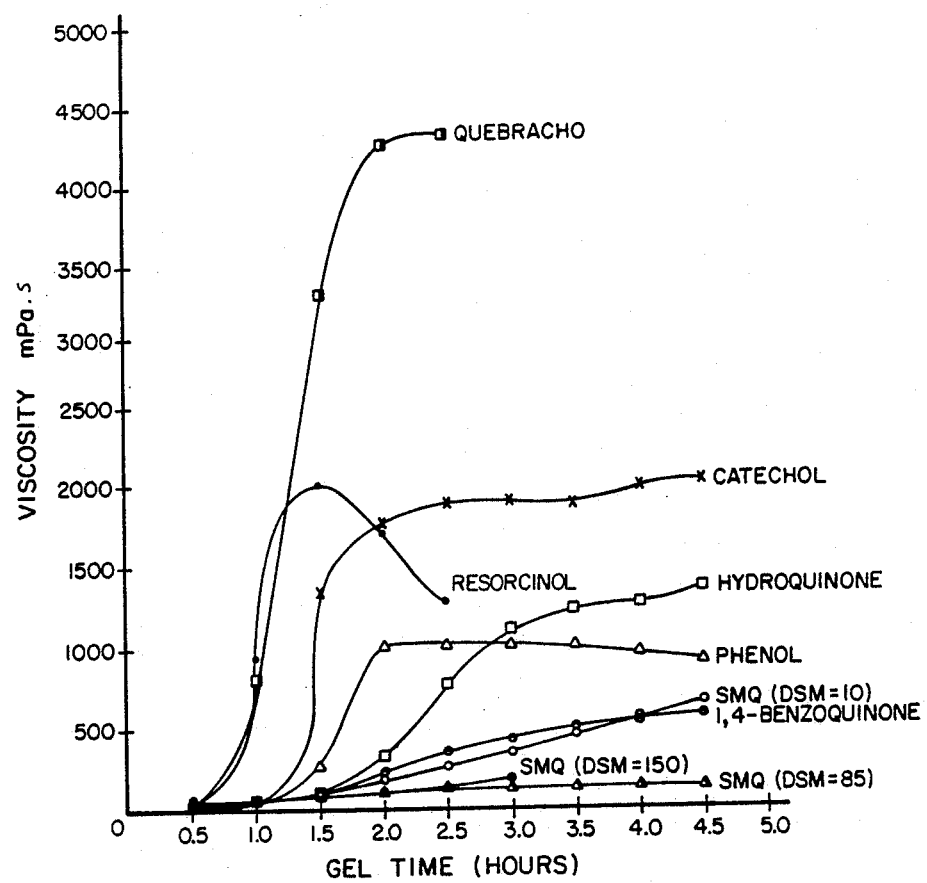
FIG. 12 shows the variation of viscosity with time for various prior art gelable solutions described in the aforementioned U.S. Pat. No. 4,246,124.

As shown in FIG. 1 and described above in Example 1, the gelable solutions used in the instant method maintain a low viscosity, usually in the range of 2–30 mPas. for at least 60% of their gel time and then rapidly form a rigid gel stable up to about 290° C. The gels formed in the instant method as true, relatively rigid gels having an elasticity which can be measured in terms of their yield point. In contrast, when viscosity/time data taken from Tables IX, X and XI of the Swanson patent were plotted, the curves shown in FIG. 12 were produced. It should be noted that the data in the Swanson patent were obtained at temperatures or 205°–325° F. (96.1–162.8° C.) as follows:

| Phenolic Component No. | Temperature (°C.) | Swanson's Table |
|---|---|---|
| 1,4-benzoquinone | 162.8 | IX |
| Resorcinol | 96.1 | X |
| Catechol | 135 | X |
| Phenol | 135 | X |
| Hydroquinone | 135 | X |
| Sulfomethylated quebracho (10) | 162.8 | X |
| SMQ (85) | 162.8 | X |
| SMQ (15) | 162.8 | X |

The data in this Figure show that in many instances, a gradual increase in viscosity started immediately after the solutions were mixed. Moreover, the viscosity of some of the Swanson gels reached a maximum and then decreased, showing that the gels were not thermally stable at the temperatures used in those tests. Many of the Swanson solutions do not yield desirable "J"-shaped curves produced by the gelable solutions used in the instant method, in which the viscosity remains low for a protracted period and then suddenly increases; rather, many of the Swanson compositions increased slowly and relatively uniformly in viscosity over a protracted period beginning shortly after the solutions were formed. Accordingly, pumping of the Swanson solutions into deep wells is likely to be difficult.

Finally, it should be noted that, because the gel times of Swanson's gelable solutions increase greatly with decreasing temperature cf. Example 1 above, the gel times of the Swanson solutions are likely to be excessively long when used in zones at temperature below 40° C., whereas the solutions used in the instant method can be made to have much shorter gel times at such relatively low temperatures.

Gel Strength

When a 10% (nominal) gelable composition usable in the instant method prepared as in Example 1 was tested at room temperature by the technique in Example 1 of Swanson, after five days less than 0.5 ml. of fluid was collected in 10 minutes (0–0.5 ml./min.) as a result of the slight shrinkage of the gel structure. This compares most favorably with the Swanson solutions which tend to weaken with time, and which gave leakage rates of 0.04 to 0.33 ml./min. at 60° C.:

The Swanson solutions were also compared with those used in the instant method by the technique of measuring gel strength described above in Example 5. The instant solutions used were the 5, 7, 10, 15 and 25% (nominal) solutions described above in Example 1, and the results are shown in Table I in Example 5 above. The Swanson solutions that are shown in Table II below are those listed in Table I run 1 of the Swanson patent (913 ppm. of resorcinol solution) and similar solutions in which the resorcinol concentration was increased to 1369 and 1847 ppm. respectively. Although Swanson claims that the results in his Table I produced most stable gels as determined by sand pack gel stability data, our test results, shown in Table II below, show that the yield stress of the Swanson gels is very low. It is seen that the solutions used in the instant method are capable of producing stronger gels than the Swanson solutions.

TABLE II

Gel Strength of Swanson Solutions Containing Resorcinol and Reten 420

| Resorcinol (ppm) | Reten 420 (ppm) | τ corr (psi)* |
|---|---|---|
| 913 | 4567 | 0.056 |
| 1369 | 4565 | 0.047 |
| 1847 | 4563 | 0.062 |

*The above τ corr values represents the pressure at which the gel is actually extruded from the tube.
The actual τ values for all groups is 0.02–0.03 psi to a maximum of 0.07 psi.

Shear Stress Tests

The crucial component of the Swanson solutions, on which their gelling depends, is a high molecular weight polyacrylamide, such as the aforementioned Reten 420. Such high molecular weight polymers are known to be susceptible to physical degradation by shear stresses, such as will be encountered when pumping these solutions down wells and into high permeability zones in oil-bearing strata. A Swanson solution (the solution used in Example I, run (1), Table I of Swanson's patent) having an initial viscosity of 25 cps. was subjected to five minutes of shearing in a Waring blender; after this shearing by the blender, the viscosity of the solution was reduced to 5 cps., indicating substantial and irreversible damage to the solution from the shearing. While the unsheared solution attained a viscosity in excess of 100,000 cps. when allowed to gel for five days, the sheared sample attained a viscosity of only 6 cps. after 10 days. This indicates that, although the Swanson solutions may give reasonably strong gels in laboratory experiments, they are unlikely to produce very strong gels under field conditions because of the shear stresses to which they are exposed during placement in oil-bearing strata.

In contrast, when the 15% (nominal) solution described above in Example 1 was sheared under the same conditions, no substantial change in either the viscosity of the solution immediately after shearing, or in the viscosity of the resultant gel, was observed.

Improvement in Oil Recovery

Figure 13:
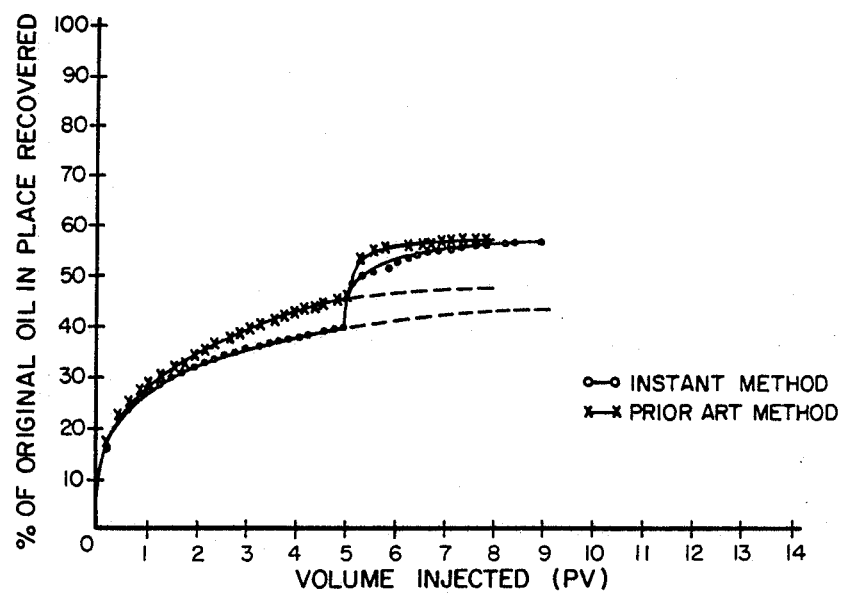
FIG. 13 is a graph similar to FIG. 7 but showing comparative results obtained using a gelable solution used in the instant method and a prior art solution described in the aforementioned U.S. Pat. No. 4,245,124.

The ability of the 15% (nominal) solution described above in Example 1 and a Swanson solution (the Reten 420/formaldehyde/minosa tannin extract solution of Swansons's Example X) to improve oil recovery from an experimental model of a sand bed were tested at 60°–65° C. by the technique described above in Example 6. The results are shown in FIG. 13. The results shown in this figure indicate that the solution used in the instant method is slightly superior to the Swanson solution in improving oil recovery. It should be noted, however, that this experiment was conducted at 60°–65° C. and the superiority of the solutions used in the instant invention would be expected to be much greater at the elevated temperatures used in steam recovery of oil or in sealing very highly permeable zones in which the weak Swanson gels would degrade very quickly. As already indicated, the gels formed by the instant method are heat-resistant, whereas the Swanson gels would degrade very quickly at the temperature used in stem recovery of oil.

EXAMPLE 12

This Example illustrates the ability of the instant methods to achieve useful reductions in the permeability of high fluid permeability zones using available solutions having relatively low total active solids contents.

Nominally 8%, 5%, 3% and 19% solutions of the powder described in Example 1 above were made up by the procedure described in that Example. A model of a high fluid permeability zone was made by packing a stainless steel tube 15.24 cm. long by 0.95 cm. internal diameter with water-washed Athabasca tar sand having a residual oil saturation of 2.6%. The packing density of the sand was approximately 1600 kg.m.$^{-3}$ with an initial permeability to a standard brine (this brine contained 1% of a mixture of sodium, calcium and magnesium chloride, in a 20:2:1::Na:Ca:Mg molar ratio) of approximately 2.7 Darcies. Separate tubes were then injected with 0.5 pore volumes of the gelable solution, followed by a 0.17 pore volume water after-flush. The treated tubes were then maintained for 24 hours at 225° C. to ensure proper gelation and there permeabilities thereafter determined at 25° C. The results are shown in FIG. 15.

Figure 15:
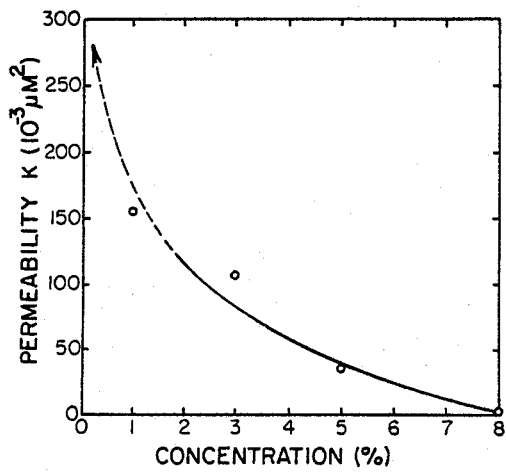
FIG. 15 is a graph showing the final permeability obtained in simulated high permability zones using the instant methods with varying concentrations of total active solids in the gelable solutions.

It will be seen from the results plotted in FIG. 15 that the final permeability of the treated sand decreased as the percentage of total active solids in the solution increased; for all practical purposes, the sand treated with the 8% total active solids solution was impermeable. However, even with the 1% total active solids solution, useful reduction in permeability was achieved; the fluid permeability of approximately 150 millidarcies produced with the 1% solution represents an approximately 18-fold reduction in permeability as compared with the original permeability of the sand, and such a reduction in permeability may often be sufficient under field conditions.

EXAMPLE 13

This Example illustrates the ability of gels produced by gelable solutions having relatively low total active solids contents to withstand high temperatures after gelling.

Figure 14:
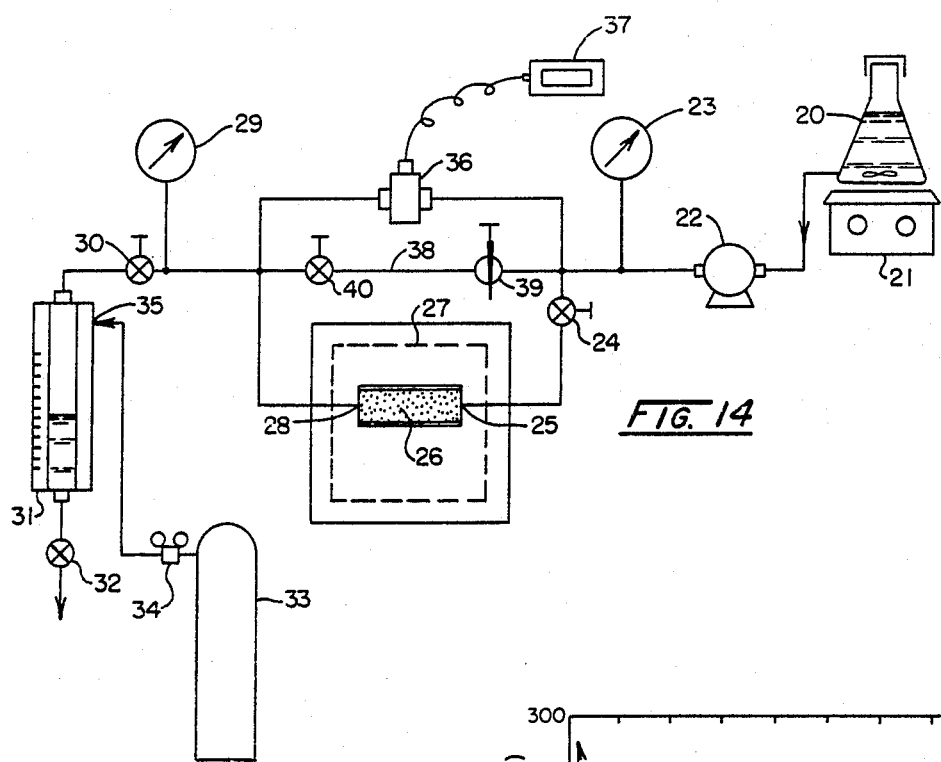
FIG. 14 is a schematic diagram (not to scale) of an experimental apparatus for measuring water and brine permeabilities at temperatures of 25°–170° C.

The apparatus used in these experiments is shown in FIG. 14. This apparatus comprises an eluent reservoir 20 supported and stirred by, and capable of being heated by, a hot plate/stirrer 21. From the reservoir 20, a liquid supply line extends via a metering pump 22 past a pressure gauge 23 and via a valve 24 to the inlet 25 of a test core 26, which is surrounded by an oven 27. From the outlet 28 of the test core 26, a line extends past a pressure gauge 29 and via a valve 30 to a pressurized collector cell 31 provided with a drain valve 32. Pressurization of the cell 31 is effected by means of a gas cylinder 33 which supplies gas via a pressure regulator 34 to the gas inlet 35 of the cell 31.

A differential pressure transducer 36 is arranged so as to measure the pressure drop across the valve 24 and the test core 26, the pressure difference measured on the transducer 36 being displayed on a digital readout 37. The valve 24 and the test core 26 are also bridged via a bypass line 38 in which are connected in series a metering valve 39 and a shut-off valve 40.

The apparatus shown in FIG. 14 is used as follows. The eluent fluid in the reservoir 20 is maintained by the hot plate 21 at a temperature sufficient to degas the fluid and is supplied by the pump 22 via the valve 24 to the test core 26 which is maintained by the oven 27 at the desired temperature. The pressure drop across the test core is measured by the differential pressure transducer 36 and displayed on the display 37. The back-pressure necessary to prevent evaporation of the eluent liquid is measured on the gauge 29, this back-pressure being set by the pressure regulator 34. The collector cell 31 also serves as a collector of the eluent liquid from the test core 26; the cell 31 can be emptied by opening the drain valve 32 without depressurizing the system.

After the material in the test core 26 has been treated by one of the instant methods, the permeability thereof can become so low that even the minimum liquid delivery rate capable of being produced by the pump 22 could produce so high a pressure gradient across the test core 26 that the gel formed therein would fracture. Accordingly, if the pressure differential across the test core approaches a potentially excessive value, the valve 24 is closed and the valve 40 (which is closed during normal operation of the apparatus) is opened. the metering valve 29 is then adjusted to provide a pressure differential across the core at or near the maximum to which the core should be exposed. The valve 24 is then opened and the eluent liquid allowed to flow through the core and the metering valve 39 simultaneously. This opening of the valve 24 lowers the pressure differential because the total flow rate remains constant. The residual core permeability (K) is then calculated from the following equation, which is derived from Darcy's equation:

$$K = Qn \frac{1}{A_1} \cdot \left( \frac{1}{\Delta P} - \frac{1}{\Delta P_2} \right)$$

wherein:

$A_1$ is the cross sectional area of the core in cm.$^2$;

K is the permeability of the core to the liquid in Darcies;

$l_l$ is the length of the core in centimeters;

Q is the flow rate of the flooding liquid in cm$^3$s$^{-1}$;

$\Delta P$ is the pressure drop when the valves 40, 39 and 24 are opened, measured in atmospheres;

$\Delta P_2$ is the pressure differential with the valve 24 closed, measured in atmospheres; and n is the viscosity of the liquid at the test temperature in mPa.s.

As the core permeability approaches zero, the pressure drop, recorded after the valve 24 is opened, becomes equal to the pressure drop recorded with the valves 39 and 40 open but with the valve 24 closed.

Sand-packed stainless steel tubes were prepared in exactly the same manner as in Example 12 above, except that the sand was packed to a density of approximately 1500 kg.m.$^{-3}$, resulting in an initial permeability to the same standard brine of approximately 8-10 Darcies. Two separate tubes were then treated by the instant method in the same manner as in Example 12 above, 0.5 pore volume of a nominal 2% or 3% solution identical (apart from concentration) to those used in Example 12 being injected into the sand, followed by a 0.17 pore volume water after-flush and maintenance of the treated tube for 24 hours at 225° C. to allow for gelling. After the gelling had been completed, the permeabilities of the treated sand were tested over the range of 25°-170° C. using the apparatus shown in FIG. 14. The results are shown in FIG. 16.

Figure 16:
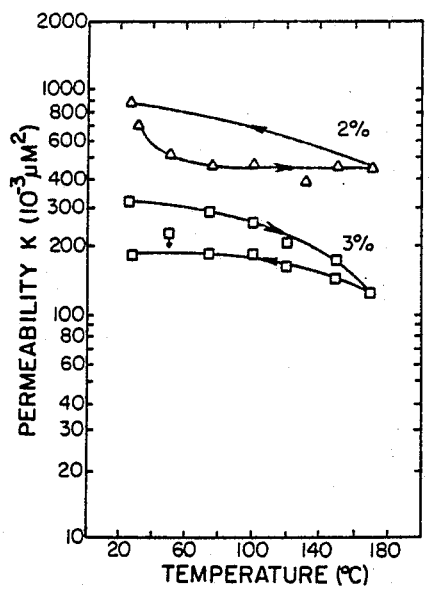
FIG. 16 is a graph of permeability against temperature for gelled form in artificial high fluid permeability zones using the instant methods with relatively low concentrations of total active solids.

The data plotted in FIG. 16 show that the 2% and 3% total active solids solutions used in these experiments did produce substantial reductions in the permeability of the packed sand and that the resultant gels were temperature stable, as indicated by the fact that permeabilities were relatively stable over the entire temperature range of 25°-170° C.

EXAMPLE 14

To test the effect of high rates of shear upon the gelable solutions used in the instant methods, gelable solutions containing 5-15% total active solids were subjected to high shear on a Hercules Hi Shear Viscometer. The shear rates used range from 0 to 18,000 sec.$^{-1}$ at 4400 rpm.

The results obtained from the gelable solutions used in the instant methods yielded viscosity against shear rate curves which were substantially parallel to those of water, although of course the curves of the gelable solutions were shifted towards higher viscosities; the viscosity values for the 15% solutions were typically 1.5-2 times the corresponding water values. However, the fact that the gelable solutions used in the instant methods did yield curves substantially parallel to water shows that the gelable solutions do not break down under high-shear conditions as do many prior art polymer-based gelable solutions for use in plugging oil-bearing strata.

It will be apparent to those skilled in the art that numerous changes and improvements may be made in the instant method without departing from the scope of the invention. Accordingly, the foregoing description is to be construed in an illustrative and not in a limitative sense, the scope of the invention being defined solely by the appended claims.

We claim:

1. A method for adjusting the fluid permeability of a high fluid permeability zone in an oil-bearing stratum, said zone having greater fluid permeability than the surrounding zones of said stratum, which method comprises:

injecting into said oil-bearing stratum via a well penetrating said stratum an aqueous, alkaline gelable solution, said solution comprising an gelable solution, said solution comprising an alkaline material, a polyphenolic vegetable material selected from the group consisting of tannin extracts, catechins and alkaline extracts of coniferous tree barks, said polyphenolic material being soluble in alkaline solution, and formaldehyde, said formaldehyde being present as formaldehyde itself, paraformaldehyde, ureaformaldehyde concentrate, hexamethylenetetramine or a phenol-formaldehyde resole, the total active solids content of said solution being from about 1 to about 33% by weight of said solution said solution having a pH of at least about 9.5 and being formed by dissolving said alkaline material, said polyphenolic vegetable material and said formaldehyde in a brine containing not more than about 0.275 percent by weight of cations having a valency greater than one and forming insoluble hydroxides, the gelling time of said solution and the rate of injection thereof being such that said solution passes down said well by which it is injected and achieves substantial penetration into said high fluid permeability zone before substantial gelling of said solution occurs; and allowing said solution to gel within said high fluid permeability zone, thereby reducing the fluid permeability of said zone.

2. A method according to claim 1 wherein said formaldehyde is present as paraformaldehyde.

3. A method according to claim 1 wherein, after said gelable solution has been injected into said oilbearing stratum, a non-gelable displacing fluid is injected into said oil-bearing stratum via said well, thereby causing said gelable solution to be displaced from about said well and preventing excessive loss of permeability around said well.

4. A method according to claim 3 wherein said displacing fluid comprises water.

5. A method according to claim 3 wherein said displacing fluid comprises a viscous aqueous solution of a polymer.

6. A method according to claim 1 wherein said oil-bearing stratum contains cations capable of causing the formation of insoluble material when in contact with said gelable solution, whereby formation of said insoluble material occurs at the interface between said high fluid permeability zone and said surrounding zones, thereby limiting the penetration of said gelable solution into said surrounding zones.

7. A method according to claim 1 wherein steam has been injected into said stratum prior to said injection of said gelable solution, and wherein, prior to said injection of said gelable solution, a cold liquid is injected into said high fluid permeability zone to cool said zone to a temperature low enough to increase the gel time of said gelable solution sufficiently to permit pumping of said gelable solution into said high fluid permeability zone before said gelable solution gels.

8. A method according to claim 1 wherein said gelable solution further comprises a high molecular weight viscosifier.

9. A method according to claim 1 wherein the concentrations of said alkaline material, said polyphenolic vegetable material and said formaldehyde are adjusted so that said gelable solution does not form a homogeneous gel completely blocking the flow of fluids through said high fluid permeability zone but substantially and permanently reduced the permeability thereof.

10. A method according to claim 9 wherein the total active solids content of solution is not greater than about 10% by weight.

11. A method according to claim 1 wherein the total active solids content of said solution is at least about 2% by weight.

12. A method according to claim 1 wherein said high fluid permeability zone is oil-wet and said injection of said gelable solution substantially reduces the fluid permeability of said zone but does not completely block the flow of fluids therethrough.

13. The method according to claim 1 wherein said gelable solution and a solution of an accelerator for accelerating the gelling of said gelable solution are piped separately down said well, said solutions being allowed to mix within said well at a point spaced from the upper end thereof to form a rapidly-gelling solution.

14. A method according to claim 13 wherein said accelerator is an alkali metal silicate.

15. A method according to claim 13 wherein at least one of said solutions further comprises a high molecular weight viscosifier.

16. A method according to claim 1 wherein, prior to or after said injection of said gelable solution, a solution of an accelerator is pumped into said high fluid permeability zone.

17. A method according to claim 16 wherein said accelerator is an alkali metal silicate.

18. A method according to claim 1 wherein at least part of said alkaline material comprises an alkali metal carbonate.

19. A method according to claim 18 wherein, after said gelable solution has gelled within said high fluid permeability zone, an acid is injected into said zone to dissolve at least part of said alkali metal carbonate.

20. A method according to claim 1 wherein the pH of said gelable solution is from about 10 to about 11.

21. A method according to claim 1 wherein said alkaline material comprises sodium hydroxide and/or sodium carbonate.

22. A method according to claim 1 wherein said polyphenolic vegetable material is mimosa tannin extract.

23. A method according to claim 1 wherein said gelable solution has a viscosity, when first formed, of from about 2 to about 30 mPa.s.

24. A method according to claim 1 wherein aid gelable solution has a gel time at 25° C. in excess of about 3 hours.

25. A method according to claim 1 wherein said gelable solution contains from about 15 to about 25 parts by weight of formaldehyde per 100 parts by weight of said polyphenolic vegetable material on a dry basis.

26. A method according to claim 1 wherein, after said solution has gelled within said high fluid permeability zone, a flooding fluid is injected into said oil-bearing stratum and oil is recovered from said oil-bearing stratum.

27. A method according to claim 26 wherein said flooding liquid comprises water, brine, an aqueous solution of a polymer, an aqueous solution of a surfactant or a hydrocarbon fluid.

28. A method for adjusting the fluid permeability of a high fluid permeability zone in an oil-bearing stratum, said zone having greater fluid permeability than the surrounding zones of said stratum, which method comprises:

injecting into said oil-bearing stratum via a well penetrating said stratum an aqueous, alkaline gelable solution, said solution comprising an alkaline material, a polyphenolic vegetable material selected from the group consisting of tannin extracts, catechins and alkaline extracts of coniferous tree barks, said polyphenolic material being soluble in alkaline solution, and formaldehyde, said formaldehyde being present as formaldehyde itself, paraformaldehyde or a phenol-formaldehyde resole, the total active solids content of said solution being from about 5 to about 33% by weight of said solution, said solution having a pH of at least about 9.5 and being formed by dissolving said alkaline material, said polyphenolic vegetable material and said formaldehyde in a brine containing not more than about 0.275 percent by weight of cations having a valency greater than one and forming insoluble hydroxides, the gelling time of said solution and the rate of injection thereof being such that said solution passes down said well by which it is injected and achieves substantial penetration into said high fluid permeability zone before substantial gelling of said solution occurs; and allowing said solution to gel within said high fluid permeability zone, thereby reducing the fluid permeability of said zone.

29. A method according to claim 28 wherein said formaldehyde is present as paraformaldehyde.

30. A method according to claim 80 wherein, after said gelable solution has been injected into said oilbearing stratum, a non-gelable displacing fluid is injected into said oil-bearing stratum via said well, thereby causing said gelable solution to be displaced from around well and preventing excessive loss of permeability around said well.

31. A method according to claim 28 wherein the total active solids content of said solution is from about 5 to about 10 percent.

32. A method according to claim 28 wherein at least part of said alkaline material comprises an alkali metal carbonate.

33. A method according to claim 32, wherein, after said gelable solution has gelled within said high fluid permeability zone, an acid is injected into said zone to dissolve at least part of said alkali metal carbonate.

34. A method according to claim 28 wherein said polyphenolic vegetable material is mimosa tannin extract.

35. A method according to claim 28 wherein said gelable solution contains from about 15 to about 25 parts by weight of formaldehyde per 100 parts by weight of said polyphenolic vegetable material on a dry basis.

36. A method according to claim 28 wherein, after said solution has gelled within said high fluid permeability zone, a flooding fluid is injected into said oil-bearing stratum and oil is recovered from said oil-bearing stratum.

37. A method for adjusting the fluid permeability of a high fluid permeability zone in an oil-bearing stratum, said zone having greater fluid permeability than the surrounding zones of said stratum, which method comprises:

injecting into said oil-bearing stratum via a well penetrating said stratum an aqueous, alkaline gelable solution, said solution comprising an alkaline material, a polyphenolic vegetable material selected from the group consisting of tannin extracts, catechins and alkaline extracts of coniferous tree barks, said polyphenolic material being soluble in alkaline solution, and formaldehyde, said formaldehyde being present as formaldehyde itself, paraformaldehyde, urea-a phenol-formaldehyde resole, the total active solids content of said solution being from about 1 to about 33% by weight of said solution, said solution having a pH of at least about 9.5, the gelling time of said solution and the rate of injection thereof being such that said solution passes down said well by which it is injected and achieves substantial penetration into said high fluid permeability zone before substantial gelling of said solution occurs;

said oil-bearing stratum containing cations capable of causing the formation of insoluble material when in contact with said gelable solution, whereby formation of said insoluble material occurs at the interface between said high fluid permeability zone and said surrounding zones, thereby limiting the penetration of said gelable solution into said surrounding zones; and allowing said solution to gel within said high fluid permeability zone, thereby reducing the fluid permeability of said zone.

38. A method according to claim 37 wherein the total active solids content of said solution is at least about 2 percent.

39. A method for adjusting the fluid permeability of a high fluid permeability zone in an oil-bearing stratum, said zone having greater fluid permeability than the surrounding zones of said stratum, which method comprises:

injecting into said oil-bearing stratum via a well penetrating said stratum an aqueous, alkaline gelable solution, said solution comprising an alkaline material, a polyphenolic vegetable material selected from the group consisting of material selected from the group consisting of tannin extracts, catechins and alkaline extracts of coniferous tree barks, said polyphenolic material being soluble in alkaline solution, and formaldehyde, said formaldehyde being present as formaldehyde itself, paraformaldehyde or a phenol-formaldehyde resole, the total active solids content of said solution being from about 5 to about 33% by weight of said solution, said solution having a pH of at least about 9.5, the gelling time of said solution and the rate of injection thereof being such that said solution passes down said well by which it is injected and achieves substantial penetration into said high fluid permeability zone before substantial gelling of said solution occurs;

said oil-bearing stratum containing cations capable of causing the formation of insoluble material when in contact with said gelable solution, whereby formation of said insoluble material occurs at the interface between said high fluid permeability zone and said surrounding zones, thereby limiting the penetration of said gelable solution into said surrounding zones; and allowing said solution to gel within said high fluid permeability zone, thereby reducing the fluid permeability of said zone.

40. A method for adjusting the fluid permeability of a high fluid permeability zone in an oil-bearing stratum, said zone having greater fluid permeability than the surrounding zones of said stratum, which method comprises:

injecting into said oil-bearing stratum via a well penetrating said stratum an aqueous alkaline gelable solution, said solution comprising an alkaline material, at least part of said alkaline material comprising an alkali metal carbonate, a polyphenolic vegetable material selected from the group consisting of tannin extracts, catechins and alkaline extracts of coniferous tree barks, said polyphenolic material being soluble in an alkaline solution, and formaldehyde, said formaldehyde being present as formaldehyde itself, paraformaldehyde, urea-formaldehyde concentrate, hexamethylenetetramine or a phenol-formaldehyde resole, the total active solids content of said solution being from about 1 to about 33% by weight of said solution, said solution having a pH of at least about 9.5, the gelling time of said solution and the rate of injection thereof being such that said solution passes down said well by which it is injected and achieves substantial penetration into said high fluid permeability zone before substantial gelling of said solution occurs;

allowing said solution to gel within said high fluid permeability zone, thereby reducing the fluid permeability of said zone;

and thereafter injecting an acid into said high fluid permeability zone to dissolve at least part of said alkali metal carbonate.

41. A method according to claim 40 wherein the total active solids content of said solution is at least about 2% by weight.

42. A method for adjusting the fluid permeability of a high fluid permeability zone in an oil-bearing stratum, said zone having greater fluid permeability than the surrounding zones of said stratum, which method comprises:

injecting into said oil-bearing stratum via a well penetrating said stratum an aqueous alkaline gelable solution, said solution comprising an alkaline material, at least part of said alkaline material comprising an alkali metal carbonate, a polyphenolic vegetable material selected from the group consisting of tannin extracts, catechins and alkaline extracts of coniferous tree barks, said polyphenolic material being soluble in an alkaline solution, and formaldehyde, said formaldehyde being present as formaldehyde itself, paraformaldehyde or a phenol-formaldehyde resole, the total active solids content of said solution being from about 5 to about 33% by weight of said solution, said solution having a pH of at least about 9.5, the gelling time of said solution and the rate of injection thereof being such that said solution passes down said well by which it is injected and achieves substantial penetration into said high fluid permeability zone before substantial gelling of said solution occurs;

allowing said solution to gel within said high fluid permeability zone, thereby reducing the fluid permeability of said zone;

and thereafter injecting an acid into said high fluid permeability zone to dissolve at least part of said alkali metal carbonate.

43. A method for adjusting the fluid permeability of a high fluid permeability zone in an oil-bearing stratum, said zone having greater fluid permeability than the surrounding zones of said stratum, which method comprises:

injecting into said oil-bearing stratum via a well penetrating said stratum an aqueous, alkaline gelable solution, said solution comprising an alkaline material, a polyphenolic vegetable material selected from the group consisting of tannin extracts, catechins and alkaline extracts of coniferous tree barks, said polyphenolic material being soluble in alkaline solution, and hexamethylenetetramine, the total active solids content of said solution being from about 1 to about 33% by weight of said solution, said solution having a pH of at least about 9.5, the gelling time of said solution and the rate of injection thereof being such that said solution passes down said well by which it is injected and achieves substantial penetration into said high fluid permeability zone before substantial gelling of said solution occurs; and allowing said solution to gel within said high fluid permeability zone, thereby reducing the fluid permeability of said zone.

44. A method according to claim 43 wherein, after said solution has gelled within said high fluid permeability zone, a flooding liquid is injected into said oil-bearing stratum and oil is recovered from said oil-bearing stratum.

* * * * *